(12) United States Patent
Morimoto

(10) Patent No.: US 7,673,963 B2
(45) Date of Patent: Mar. 9, 2010

(54) INK UNIT INCLUDING INK AND INK-WETTED MEMBER

(75) Inventor: Kiyoshi Morimoto, Ashigarakami-gun (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 671 days.

(21) Appl. No.: 11/517,271

(22) Filed: Sep. 8, 2006

(65) Prior Publication Data

US 2007/0058017 A1 Mar. 15, 2007

(30) Foreign Application Priority Data

Sep. 12, 2005 (JP) .............................. 2005-263669

(51) Int. Cl.
*B41J 2/165* (2006.01)

(52) U.S. Cl. ............................. 347/31; 347/86; 347/100

(58) Field of Classification Search .................. 347/29, 347/30, 32, 31, 100, 95, 96, 101, 85, 86, 347/84, 33; 106/31.6, 31.13, 31.27; 523/160

See application file for complete search history.

(56) References Cited

U.S. PATENT DOCUMENTS

| 4,675,356 A | * | 6/1987 | Miyata ........................ 524/424 |
| 6,698,871 B1 | * | 3/2004 | Hayashi et al. ................ 347/86 |
| 2003/0008080 A1 | * | 1/2003 | Doi et al. .................... 106/31.6 |

FOREIGN PATENT DOCUMENTS

| JP | 63-216752 A | 9/1988 |
| JP | 2696828 B2 | 1/1998 |
| JP | 2003-3095 A | 1/2003 |

* cited by examiner

*Primary Examiner*—Manish S Shah
(74) *Attorney, Agent, or Firm*—Buchanan Ingersoll & Rooney PC

(57) ABSTRACT

An ink unit having: an ink utilized for an inkjet recorder; and a wetted member that contacts with the ink, wherein the ink includes a pigment dispersedly held in a medium, and the pigment contains particles having a size of 200 nm or larger in 2 volume percent or less, and wherein a principal component of the ink-wetted member is [1] a compound of specific hydrotalcite; [2] a fatty acid and/or a fatty acid derivative; [3 ] a phenolic antioxidant having an isocyanurate skeleton; or [4] a polyolefin including an alkyl-substituted benzylidene sorbitol.

12 Claims, 2 Drawing Sheets

INK UNIT INCLUDING INK AND INK-WETTED MEMBER

BACKGROUND OF THE INVENTION

1. Field of the Invention

The present invention relates to an ink absorber for use in an inkjet recorder having an ink-ejection type recording head, an ink-wetted member such as an ink tank, an inkjet cartridge, and the like, as well as to ink.

2. Description of the Related Art

A hitherto-known, so-called inkjet recorder has a recording head of ink ejection type provided with ejection ports for ejecting ink, and ejects ink in the form of ink droplets from the recording head to thus cause the ink to adhere to a sheet, thereby recording an image. The inkjet recorder has an ink tank for storing ink, and ink is supplied from the ink tank to the recording head. A member which remains in wetted contact with ink at all times has heretofore been formed from resin materials, metallic materials, rubber materials, and the like. In view of cost and ease of processing, resin materials are often used. Example resin materials include polyolefins such as polypropylene and polyethylene, polyvinyl chloride, polyvinylidene chloride, silicone, an ethylene-vinyl acetate copolymer, ABS, polyacetal, nylon, unsaturated polyester, aramid, PS, PET, PVC, and the like. In view of environmentally-friendly recycling, polyolefin such as polypropylene and polyethylene is preferably used.

There may be a case where antioxidant is added to a resin material in order to prevent decomposition and deterioration of the resin material, which would otherwise be caused when the resin material is oxidized by heat, light, oxygen, or the like, during or after the process of manufacturing or processing the resin material. In order to capture radicals which grow during a stage of initial chain growth induced by auto-oxidation of a resin material, in a known technique an antioxidant (e.g., phenolic antioxidant, amine-based antioxidant, phosphorus antioxidant, thioether oxidant) has been added.

In relation to a material having a high degree of crystallinity such as polyolefin; e.g., polypropylene, polyethylene, and the like; particularly, polypropylene, crystal of a molded article is generally nonuniform, scatters light, and exhibits insufficient transparency. In order to generate a minute, uniform crystal, a bis(p-methylbenzylidene)sorbitol (trade name: Gelol MD) has hitherto been known to be added as a crystallization nucleating agent.

A catalyst, such as a Ziegler-Natta catalyst, is usually used for polymerization of olefin during manufacture of polyolefin such as polypropylene, polyethylene, and the like. Residuals of catalyst, such as chlorine compounds, remain in generated polymer. The catalyst still remaining in polymer has a potential risk of corroding or degrading polymer such as yellowing of polymer. For this reason, a counteragent has been known to be added to the resultant polymer so as to react with the residual catalyst to thus neutralize the residual catalyst. Metallic salt of fatty acid, such as calcium stearate, or hydrotalcite (basic aluminum magnesium carbonate) has been known to be added as a counteragent.

Metallic salt of fatty acid, such as calcium stearate, is commonly added in an amount of 1,000 to 1,500 ppm to polymer as a counteragent for polypropylene. Using the metallic salt as the ink-wetted member has been known to generate fibrous suspended matters which in some cases will hinder flowability of ink. In order to prevent generation of fibrous suspended matters, JP-A-63-216752 proposes a method for reducing the amount of fatty acid, such as calcium stearate, to 100 ppm or less.

Japanese Patent No. 2696828 describes a method for solving a problem of suspended matters being formed by a solute originating from the ink-wetted member by means of a combination of the density of sodium ions in ink with the ink-wetted member. This method is found to be insufficient in terms of accuracy of ejection of ink achieved after the ink left for a long period of time has been brought into contact with the ink-wetted member.

In recent years, employing ink which uses a pigment as an ink coloring material for inkjet purpose has been energetically discussed. Transforming a pigment into minute particles has been proposed as a technique for realizing a pigment which enhances print quality, an ejection characteristic, storage stability, a clogging characteristic, a fixing characteristic, rubfastness, and an increase in print speed, all of which are drawbacks in pigment ink for inkjet use. For instance, JP-A-2003-3095proposes that a mean particle size of a pigment preferably ranges from 50 to 100 nm. However, this technique is not preferable in terms of inconsistencies in density and inconsistent streaks, and a further improvement in technique is sought.

SUMMARY OF THE INVENTION

The objective of the present invention is to enhance the accuracy of ejection of ink achieved after ink has been brought in contact with an ink-wetted member (when a principal component of the member is polyolefins) such as an ink tank, an inkjet cartridge, and/or an ink absorber for a long period of time. Specifically, when variations in the volume of ejected ink have become great and displacement from a target point of impact has become large, inconsistencies in density and streaks are induced. Accordingly, the objective of the present invention is to improve the quality of inkjet printing.

The researchers of the present invention have attempted to transform a pigment into minute particles by means of reducing a volumetric mean particle size of the pigment to 110 nm, 70 nm, and 40 nm, and brought ink into contact with the ink-wetted member for a long period of time, thereby improving the accuracy of ejection of ink. A mere reduction in the volumetric mean particle size of a pigment has ended in a failure to solve the problem. However, it was found that the problem could be solved by a combination of a specific ink-wetted member with specific ink.

The objectives of the present invention are achieved by the following means.

[1] An ink unit comprising:
an ink utilized for an inkjet recorder; and
a wetted member that contacts with the ink,
wherein the ink comprises a pigment dispersedly held in a medium, and the pigment contains particles of 200 nm or larger in 2 percent by volume or less, and
wherein a principal component of the ink-wetted member is a polyolefin produced by addition of a hydrotalcite compound represented by formula (X):
Formula (X)

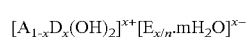

wherein A in Formula (X) represents a divalent metal;
D represents a trivalent metal;
E represents an n-valence anion;
"m" represents an integer; and
"x" ranges from $0<x\leq 0.5$.

Reference symbol A preferably represents bivalent metal such as Mg, Mn, Fe, Co, Ni, Cu, Zn, and the like; D preferably represents trivalent metal such as Al, Fe, Cr, Co, In, and the like; and E preferably represents n-valence anion such as OH, F, Cl, Br, $NO_3$, $CO_3$, $SO_4$, $Fe(CN)_6$, $CH_3COO$, and the like.

[2] An ink unit comprising:
an ink utilized for an inkjet recorder; and
a wetted member that contacts with the ink,
wherein the ink comprises a pigment dispersedly held in a medium, and the pigment contains particles of 200 nm or larger in 2 percent by volume or less, and
wherein a principal component of the ink-wetted member is a polyolefin produced by addition of at least one of a fatty acid and a fatty acid derivative.

[3] An ink unit comprising:
an ink utilized for an inkjet recorder; and
a wetted member that contacts with the ink,
wherein the ink comprises a pigment dispersedly held in a medium, and the pigment contains particles of 200 nm or larger in 2 percent by volume or less, and
wherein a principal component of the ink-wetted member is a polyolefin produced by addition of a phenolic antioxidant.

[4] An ink unit comprising:
an ink utilized for an inkjet recorder; and
a wetted member that contacts with the ink,
wherein the ink comprises a pigment dispersedly held in a medium, and the pigment contains particles of 200 nm or larger in 2 percent by volume or less, and
wherein a principal component of the ink-wetted member is a polyolefin produced by addition of a benzylidenesorbitol.

[5] The ink unit as described in any of [1] to [4] above, wherein the pigment is one of CI Pigment Yellow-12, CI Pigment Yellow-17, CI Pigment Yellow-55, CI Pigment Yellow-74, CI Pigment Yellow-97, CI Pigment Yellow-120, CI Pigment Yellow-128, CI Pigment Yellow-151, CI Pigment Yellow-155 and CI Pigment Yellow-180.

[6] The ink unit as described in any of [1] to [4] above, wherein the pigment is one of CI Pigment Red-122, CI Pigment Violet-19, CI Pigment Red-57:1, CI Pigment Red-146 and CI Pigment Blue-15:3.

[7] The ink unit as described in any of [1] to [6] above, wherein the ink is an ink set comprising at least a black ink, a cyan ink, a magenta ink and a yellow ink, and
wherein all of the black ink, the cyan ink, the magenta ink and the yellow ink contain a pigment dispersedly held in a medium, and the pigment contains particles of 200 nm or larger in 2 percent by volume or less.

[8] The ink unit as described in any of [1] to [7] above, wherein the pigment contains particles of 200 nm or larger in 1 percent by volume or less.

[9] The ink unit as described in any of [1] to [7] above, wherein the pigment contains particles of 200 nm or larger in 0.5 percent by volume or less.

[10] The ink unit as described in any of [1] to [9] above, wherein the polyolefin is a polypropylene.

[11] The ink unit as described in any of [1] to [10] above, wherein the ink-wetted member is an ink-wetted member of at least one of an ink tank and an ink cartridge.

[12] The ink unit as described in any of [1] to [10] above, wherein the ink-wetted member is an ink-wetted member of an ink absorber.

[13] The ink unit as described in any of [1] to [10] above, wherein the ink-wetted member is an ink-wetted member of at least one of a tube of an ink supply system, a common flow passage of a head, a pressure chamber of a head and a nozzle of a head.

DETAILED DESCRIPTION OF THE INVENTION

Figure 1:
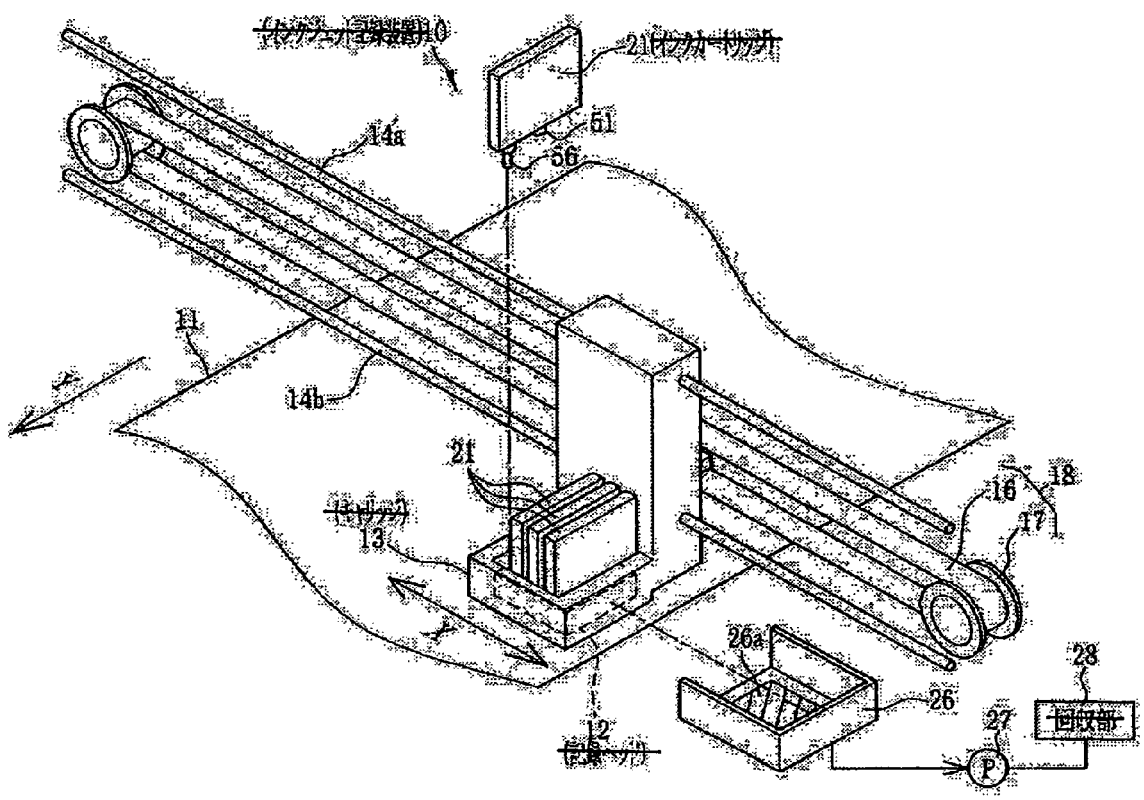
FIG. 1 is an example of a preferred inkjet recorder of the present invention.

As a result of ardent studies conducted by the present inventors in order to achieve the objects, it is found that a reduction in variations in the volume of ejected ink and a decrease in displacement from a target point of impact are achieved by means of a combination of a specific ink-wetted member with specific ink in connection with the evaluation of ejection of ink performed after ink has been left in contact with the ink-wetted member used in the inkjet recorder over a long period of time or after ink has been brought into contact with the ink-wetted member at high temperature. As a result of ink having been brought into contact with the ink-wetted member for a long period of time, occurrence of suspended matters in ink is not ascertained, and hence drawbacks are not made noticeable by means of visual evaluation of ink. Superiority or inferiority in accuracy of ejection is construed to be a phenomenon attributable to presence/absence of precipitates on a meniscus in the vicinity of ink ejection nozzles.

In order to achieve the objects, [1] is characterized in that the principal component of the ink-wetted member is polyolefins obtained by means of adding compounds of hydrotalcites in connection with a wetted member which is to contact ink used for an inkjet recorder, wherein the ink contains a pigment dispersedly held in a medium; and particles of 200 nm or larger in the pigment account for 2 percent by volume or less.

Further, [2] is characterized in that a principal component of the ink-wetted member is a polyolefin produced by addition of a fatty acid and/or fatty acid derivatives.

Further, [3] is characterized in that a principal component of the ink-wetted member is polyolefin produced by addition of phenolic antioxidant having an isocyanurate skeleton.

Moreover, [4] is characterized in that a principal component of the ink-wetted member is a polyolefin produced by addition of benzylidenesorbitols obtained by means of addition of alkyl-substituted benzylidene sorbitol. [5] is characterized in that the pigment is one of CI Pigment Yellow-12, CI Pigment Yellow-17, CI Pigment Yellow-55, CI Pigment Yellow-74, CI Pigment Yellow-97, CI Pigment Yellow-120, CI Pigment Yellow-128, CI Pigment Yellow-151, CI Pigment Yellow-155, and CI Pigment Yellow-180.

[6] is characterized in that the pigment is one of CI Pigment Red-122, CI Pigment Violet-19, CI Pigment Red-57:1, CI Pigment Red-146, and CI Pigment Blue-15:3.

[7] is characterized in that the ink is an ink set including at least black ink, cyan ink, magenta ink, and yellow ink; and that all of the black ink, the cyan ink, the magenta ink, and the yellow ink contain a pigment dispersedly held in a medium, and particles of 200 nm or larger in the pigment account for 2 percent by volume or less.

[8] is characterized in that particles of 200 nm or larger in the pigment account for one percent by volume or less.

[9] is characterized in that particles of 200 nm or larger in the pigment account for 0.5 percent by volume or less.

A volumetric mean particle size of the pigment preferably ranges from 30 to 150 nm, more preferably from 40 to 120 nm.

The ink-wetted member referred to herein signifies a member, such as an ink tank, an ink cartridge, or an ink absorber, which contacts ink. The principal component of the wetted member is a polyolefin. However, the principal component of the ink-wetted member of the present invention shows that polyolefins account for 50% or more (in surface area ratio, and preferably in a mass ratio as well), preferably 70% or more, more preferably 95% or more, and much more preferably 99% or more of the entire wetted portion of the member. (In this specification, mass ratio is equal to weight ratio.)

The term "ink unit" used herein represents an aggregate of ink and an ink wetted member in an ink supply system (an ink tank, a tube, an ink cartridge, and an ink absorber) and an ink-wetted member in a head (a common flow passage, a pressure chamber, and a nozzle).

Polyolefins in the present invention refer to a polymer of olefin, and include polyethylene, polypropylene, polybutene, polystyrene, and copolymers thereof. A preferred polymer (resin) is formed from ethylene and/or propylene, or selected from homo-polypropylene (homo-PP), ethylene-propylene-random copolymer (random copolymer PP), and ethylene-propylene-block copolymer (block copolymer PP).

Hydrotalcite compounds are added to polyolefins of the present invention.

The hydrotalcite compounds are unstable ratio compounds represented by the formula $[A_{1-x}D_x(OH)_2]^{x+}[E_{x/n} \cdot mH_2O]^{x-}$ [A in Formula represents a divalent metal such as Mg, Mn, Fe, Co, Ni, Cu, Zn, and the like; D represents a trivalent metal such as Al, Fe, Cr, Co, In, and the like; E represents an n—valence anion such as OH, F, Cl, Br, $NO_3$, $CO_3$, $SO_4$, $Fe(CN)_6$, $CH_3COO$, and the like; "m" represents an integer; and "x" ranges from $0<x\leq 0.5$].

For instance, specific examples of hydrotalcite compounds can be enumerated as:

$Mg_6Al_2(OH)_{16} \cdot CO_3 \cdot 4H_2O$
$Mg_{4.5}Al_2(OH)_{13} \cdot CO_3 \cdot 3.5H_2O$
$Ca_6Al_2(OH)_{16} \cdot CO_3 \cdot 4H_2O$
$Zn_6Al_2(OH)_{16} \cdot CO_3 \cdot 4H_2O$
$Mg_3ZnAl_2(OH)_{12} \cdot CO_3 \cdot 4H_2O$ Compounds described in JP-A-6-100734, JP-A-6-256588, JP-A-10-87907, JP-A-10-139941, and JP-A-2001-316530 can be used as the hydrotalcite compounds employed in the present invention.

Particularly-preferred compounds are represented by a formula $Mg_{1-x}Al_x(OH)_2(CO_3)_{x/2} \cdot mH_2O$ ($0<X\leq 0.5$).

No particular limitations are imposed on the method for adding hydrotalcite compounds into polyolefin resin, and a known method can be adopted. For instance, there can be used a method for subjecting resin powder or pellets and powder of an additive agent to dry-blending or a method for producing a master batch containing a high concentration of additive agent, and adding the master batch to unadded resin. There can also be adopted a continuous melt-kneading method for adding a predetermined amount of hydrotalcite compound, mixing the mixture by use of a commonly-known mixer such as a Henshel mixer, a V blender or tumbler mixer, and further mixing the thus-mixed mixture by use of a uniaxial kneader or a dual-axis kneader such as a dual-axis kneader of meshed unidirectional rotary type, a dual-axis kneader of meshed bi-directional rotary type, a dual-axis kneader of unmeshed unidirectional rotary type, and a dual-axis kneader of unmeshed bi-directional rotary type; or a batch melt-kneading method of roller type, Banbury type, or the like. A processing method for producing a molded article from a polyolefin resin composition is not subjected to a specific limitation. Any ordinary resin molding method, such as an extruding method, a calendering method, an injection molding method, a blow molding method, an inflation molding method, may also be used.

A preferred amount of hydrotalcite compound to be added ranges from 10 ppm to 10,000 ppm and more preferably 100 ppm to 1,000 ppm with respect to polyolefins.

A fatty acid and/or fatty acid derivatives are added to polyolefins of the present invention. Specific examples of fatty acid include a stearic acid, a behenic acid, an oleic acid, and an erucic acid. Specific examples of a fatty acid derivatives include Ca salt, Al salt, Mg salt, and Zn salt of stearic amides; octadecanamides; Ca salt, Al salt, Mg salt, and Zn salt of a behenic acid; amide behenates; Ca salt, Al salt, Mg salt, and Zn salt of an oleic acid; oleic amide; Ca salt, Al salt, Mg salt, and Zn salt of an erucic acid; and amide erucate. In addition, compounds described as an antiacid and a lubricant in JP-A-2003-96246 can be used as the fatty acid and/or the fatty acid derivatives.

No particular limitations are imposed on the method for adding a fatty acid and/or fatty acid derivatives into polyolefin resin, and a known method can be adopted. For instance, there can be used a method for subjecting resin powder or pellets and powder of an additive agent to dry-blending or a method for producing a master batch containing a high concentration of additive agent and adding the master batch to an unadded resin. There can also be adopted a continuous melt-kneading method for adding a predetermined amount of fatty acid and/or fatty acid derivatives, mixing the mixture by use of a commonly-known mixer such as a Henshel mixer, a V blender or tumbler mixer, and further mixing the thus-mixed mixture by use of a uniaxial kneader or a dual-axis kneader such as a dual-axis kneader of meshed unidirectional rotary type, a dual-axis kneader of meshed bi-directional rotary type, a dual-axis kneader of unmeshed unidirectional rotary type, and a dual-axis kneader of unmeshed bi-directional rotary type; or a batch melt-kneading method of roller type, Banbury type, or the like. A processing method for producing a molded article from a polyolefin resin composition is not subjected to a specific limitation. Any of ordinary resin molding methods, such as an extruding method, a calendering method, an injection molding method, a blow molding method, and an inflation molding method, may also be used.

A preferred amount of a fatty acid and/or fatty acid derivatives to be added ranges from 10 ppm to 1,000 ppm, more preferably 50 ppm to 500 ppm with respect to polyolefins.

A phenolic antioxidant is added to the polyolefins of the present invention.

Specific examples of the phenolic antioxidant include, but are not limited to, tris(4-t-butyl-2,6-dimethyl-3-hydroxybenzyl) isocyanurate, tris(3,5-di-t-butyl-4-hydroxybenzyl)isocyanurate, 2,6-di-tert-butyl-4-methylphenol, 4-hydroxymethyl-2,6-ditertiarybutylphenol, 2,6-di-tert-butyl-4-ethylphenol, butylated hydroxyanisole, n-octadecyl.3-(4-hydroxy-3,5-di-tert-butylphenyl)propionate, di-stearyl.(4-hydroxy-3-methyl-5-tert-butyl)benzylmalonate, propyl gallate, octyl gallate, dodecyl gallate, tocopherol, 2,2'-methylenebis(4-methyl-6-tert-butyl-phenol), 2,2'-methylenebis (4-ethyl-6-tert-butyl-phenol), 4, 4'-methylenebis(2,6-di-tert-butyl-phenol), 4,4'-butylidene-bis(6-tert-butyl-m-cresol), 4,4'-thiobis(6-tert-butyl-m-cresol), styrenated phenol, N,N'-hexamethylene-bis(3,5-di-tert-butyl-4-hydroxyhydrocinnamide), bis(3,5-di-tert-butyl-4-hydroxybenzylethylesterphosphonate)calcium, 1,1,3-tris(2-methyl-4-hydroxy-5-tert-butyl-phenyl)butane, 1,3,5-trimethyl-2,4,6-tris(3,5-di-tert-butyl-4-hydroxybenzyl)benzene, tetrakis[3-(3,5-di-tert-butyl-4-hydroxyphenyl)propionyloxymethyl]methane, 1,6-hexanediol-bis[3-(3,5-di-tert-butyl-4-hydroxyphenyl) propionate], 2,2'-methylenebis (4-methyl-6-cyclohexanephenol), 2,2'-methylenebis[6-(1-methylcyclohexyl)-p-cresol], 1,3,5-tris(4-tert-butyl-3- hydroxy-2,6-dimethylbenzyl)isocyanuric acid, 1,3,5-tris(3,5-di-tert-butyl-4-hydroxybenzyl)isocyanuric acid, triethylene glycol-bis[3-(3-tert-butyl-4-hydroxy-5-methylphenyl)propionate], 2,2'-oxamide-bis [ethyl.3-(3,5-di-tert-butyl-4-hydroxyphenyl)propionate], 6-(4-hydroxy-3,5-di-tert-butylanilino)-2,4-di-octyl-thio-1,3,5-triazine, bis[2-tert-butyl-4-methyl-6-(2-hydroxy-3-tert-butyl-5-methylbenzyl) phenyl]terephthalate, 3,9-bis[2-[3-(3-tert-butyl-4-hydroxy-5-methylphenyl)propionyloxy]-1,1-dimethylethyl]-2,4,8,10-tetraoxaspiro[5.5]undecane, or 3,9-bis[2-[3-(3,5-di-tert-butyl-4-hydroxyphenyl)propionyloxy]-1,1-dimethylethyl]-2,4,8,10-tetraoxaspiro[5.5]undecane, and the like.

Preferred examples of the phenolic antioxidant include tris(4-t-butyl-2,6-dimethyl-3-hydroxybenzyl)isocyanurate, tris(3,5-di-t-butyl-4-hydroxybenzyl)isocyanurate, 2,6-di-tert-butyl-4-methylphenol, n-octadecyl.3-(4-hydroxy-3,5-di-tert-butylphenyl) propionate, tetrakis[3-(3,5-di-tert-butyl-4-hydroxyphenyl)propionyloxymethyl]methane, triethylene glycol-bis[3-(3-tert-butyl-4-hydroxy-5-methylphenyl) propionate], 4,4'-butylidene-bis(6-tert-butyl-m-cresol), 4,4'-thiobis(6-tert-butyl-m-cresol), 1,3,5-tris(3,5-di-tert-butyl-4-hydroxybenzyl)isocyanuric acid, 1,1,3-tris(2-methyl-4-hydroxy-5-tert-butyl-phenyl)butane, 3,9-bis [2-[3-(3-tert-butyl-4-hydroxy-5-methylphenyl)propionyloxy]-1,1-dimethylethyl]-2,4,8,10-tetraoxaspiro[5.5]undecane, and the like.

Compounds described in JP-A-5-25330, JP-A-5-214176, JP-A-8-231779, JP-A-8-283473, JP-A-9-67474, JP-A-9-169875, JP-A-11-255973, and JP-A-2001-172438can be used as the phenolic antioxidant employed in the present invention.

No particular limitations are imposed on the method for adding the phenolic antioxidant into polyolefin resin, and a known method can be adopted. For instance, there can be used a method for subjecting resin powder or pellets and powder of an additive agent to dry-blending or a method for producing a master batch containing a high concentration of additive agent and adding the master batch to an unadded resin. There can also be adopted a continuous melt-kneading method for adding a predetermined amount of phenolic antioxidant, mixing the mixture by use of a commonly-known mixer such as a Henshel mixer, a V blender or tumbler mixer, and further mixing the thus-mixed mixture by use of a uniaxial kneader or a dual-axis kneader such as a dual-axis kneader of meshed unidirectional rotary type, a dual-axis kneader of meshed bi-directional rotary type, a dual-axis kneader of unmeshed unidirectional rotary type, and a dual-axis kneader of unmeshed bi-directional rotary type; or a batch melt-kneading method of roller type, Banbury type, or the like. A processing method for producing a molded article from a polyolefin resin composition is not subjected to a specific limitation. Any of ordinary resin molding methods, such as an extruding method, a calendering method, an injection molding method, a blow molding method, or an inflation molding method, may also be used.

A preferred amount of phenolic antioxidant to be added ranges from 100 ppm to 1,000 ppm, more preferably 500 ppm to 5,000 ppm with respect to polyolefins.

Benzylidenesorbitols are added to polyolefins of the present invention.

Specific examples of benzylidenesorbitols include
1,3:2,4-di-benzylidenesorbitol,
1,3:2,4-bis(p-methylbenzylidene) sorbitol,
1,3:2,4-bis(p-methylbenzylidene benzylidene) sorbitol,
1,3:2,4-bis(3,4-dimethylbenzylidene) sorbitol,
1,3:2,4-(2,4-dimethylbenzylidene, benzylidene) sorbitol,
1,3:2,4-(2,5-dimethylbenzylidene, benzylidene) sorbitol,
1,3:2,4-bis(p-ethylbenzylidene) sorbitol,
1,3:2,4-bis(p-propylbenzylidene) sorbitol,
1,3:2,4-bis(p-butylbenzylidene) sorbitol,
1,3:2,4-bis(p-ethoxybenzylidene) sorbitol,
1,3:2,4-bis(p-butoxybenzylidene) sorbitol,
1,3:2,4-bis(p-chlorobenzylidene) sorbitol,
1,3:2,4-bis(p-bromobenzylidene)sorbitol, and the like.
1,3:2,4-di-benzylidenesorbitol,
1,3:2,4-bis(p-methylbenzylidene) sorbitol,
1,3:2,4-bis(p-methylbenzylidene benzylidene) sorbitol,
1,3:2,4-bis(3,4-dimethylbenzylidene) sorbitol,
1,3:2,4-(2,4-dimethylbenzylidene, benzylidene) sorbitol,
1,3:2,4-(2,5-dimethylbenzylidene, benzylidene) sorbitol, and
1,3:2,4-bis(p-ethylbenzylidene) sorbitol can be mentioned as especially-preferable examples of benzylidenesorbitols.

Compounds described in JP-A-7-102123, JP-A-7-173342, JP-A-7-278362, JP-A-9-157452, JP-A-9-286787, JP-A-2001-26682, JP-A-2001-240698, and JP-A-2003-96246 can be used as the benzylidenesorbitols employed in the present invention.

No particular limitations are imposed on the method for adding benzylidenesorbitols into polyolefin resin, and a known method can be adopted. For instance, there can be used a method for subjecting resin powder or pellets and powder of an additive agent to dry-blending or a method for producing a master batch containing a high concentration of additive agent and adding the master batch to an unadded resin. There can also be adopted a continuous melt-kneading method for adding a predetermined amount of benzylidenesorbitols, mixing the mixture by use of a commonly-known mixer such as a Henshel mixer, a V blender or tumbler mixer, and further mixing the thus-mixed mixture by use of a uniaxial kneader or a dual-axis kneader such as a dual-axis kneader of meshed unidirectional rotary type, a dual-axis kneader of meshed bi-directional rotary type, a dual-axis kneader of unmeshed unidirectional rotary type, and a dual-axis kneader of unmeshed bi-directional rotary type; or a batch melt-kneading method of roller type, Banbury type, or the like. A processing method for producing a molded article from a polyolefin resin composition is not subjected to a specific limitation. Any of ordinary resin molding methods, such as an extruding method, a calendering method, an injection molding method, a blow molding method, or an inflation molding method, may also be used.

A preferred amount of sorbitol derivatives to be added ranges from 100 ppm to 10,000 ppm, more preferably 500 ppm to 5,000 ppm, with respect to polyolefins.

As mentioned above, the characteristic of the present invention lies in the fact that particles of 200 nm or larger in the pigment account for 2percent by volume or less. Although particle sizes employed in the present invention can be measured by an ordinary method, the sizes can also be measured by use of, e.g., Particle Size Analyzer UPA150 (NIKKISO Co., Ltd.).

As described on page 518 of Encyclopedic Dictionary of Chemistry, Third Edition, April 1, 1994 (edited by Michinori OKI, et al.), the term "pigment" is a generic designation of coloring matters which hardly dissolve in water or an organic solvent (white matters are included in the case of an inorganic pigment), and comprises organic pigments and inorganic pigments.

The "pigment dispersedly held in a medium" is used in the present invention. However, the medium may contain a dispersing agent or may not contain the same. Lipophilic mediums or aqueous mediums may be used as a medium, but the aqueous mediums are preferable.

A self-dispersing pigment can be mentioned as a pigment preferably used in the present invention. The self-dispersing pigment is formed by means of bonding a plurality of hydrophilic groups and/or salts thereof (hereinafter called "dispersive property imparting groups") directly to the surface of the pigment or indirectly to the same by way of an alkyl group, an alkyl ether group, an aryl group, and the like. The self-dispersing pigment can be dispersed and/or dissolved in an aqueous medium without use of a dispersing agent. Now, the expression "dispersed and/or dissolved in an aqueous medium without use of a dispersing agent" signifies a state where a pigment can be dispersed in an aqueous medium even when a dispersing agent used for dispersing a pigment is not used.

Ink containing the self-dispersing pigment as a coloring agent does not need to contain a dispersing agent which is contained in order to disperse an ordinary pigment, such as that mentioned above. Foaming, which would otherwise be caused by a deterioration in a defoaming characteristic induced by the dispersing agent, hardly arises, and ink exhibiting superior ejection stability is easy to prepare.

—COOH, —CO, —OH, —$SO_3H$, $PO_3H_2$, quaternary ammonium, and salts thereof can be mentioned as the dispersive-property-imparting groups bonded to the surface of the self-dispersing pigment. These dispersive property imparting groups are manufactured by means of subjecting a pigment, which is to become a raw material, to physical treatment or chemical treatment, thereby bonding (grafting) the dispersive-property-imparting group or an active species having the dispersive-property-imparting group to the surface of the pigment. For instance, vacuum plasma treatment, and the like, can be mentioned as physical treatment. Further, a wet oxidation method for oxidizing the surface of a pigment in water by means of an oxidant, a method for bonding a carboxyl group by way of a phenyl group by means of bonding a p-amino benzoic acid to the surface of the pigment, and the like can be mentioned as chemical treatment.

In the present invention, a self-dispersing pigment—which is subjected to surface treatment through oxidation treatment using a hypohalous acid and/or a hypohalite or oxidation treatment using ozone is preferable in terms of a high degree of coloring.

Commercial products can also be utilized as the self-dispersing pigment. Microjet CW-1 (trade name: Orient Chemical Industries Ltd.), CAB-O-JET200, CAB-O-JET300 (trade names: CABOT Corporation), and the like, can be mentioned.

The self-dispersing pigment is contained, preferably within a range from 2 to 20 mass percent, in the ink of the present invention.

Micro-encapsulated pigments can be mentioned as the pigment preferably used in the present invention. The micro-encapsulated pigments are pigments coated with resin.

Resin of the micro-encapsulated pigments is not limited. However, preferable resin exhibits self-dispersing capability or dissolution capability with respect to water, and is a macromolecular compound having an (acidic) anionic group. Preferable resin usually has a number-average molecular weight of about 1,000 to 100,000, and particularly preferable resin has a number-average molecular weight of about 3,000 to 50,000. The resin is preferably dissolved in an organic solvent to thus produce a solution. As a result of the number-average molecular weight of resin falling within the range, resin can sufficiently exhibit the function of a coating film with respect to a pigment or the function of a coating film in an ink composition.

Resin itself may has self-dispersing capability or dissolving capability, or may also be given an analogous function by means of additional introduction. For instance, an anionic group, such as a carboxyl group, a sulfonic group, or a phosphonic acid group, may be introduced into resin, by means of neutralizing resin by use of, e.g., organic amine, alkaline metal, or the like. One or two anionic groups of the same type or different types may be introduced into resin. In the present invention, resin which is neutralized by a base and provided with introduction of a carboxyl group is preferably used.

As mentioned above, in the present invention, using resin in the form of a salt of alkaline metal or a salt of organic amine is preferable. When resin has been used in the form of a salt, ink exhibiting a superior re-dispersive characteristic and superior reliability can be provided. Specific example salts formed from resin and alkaline metal include a lithium salt, a sodium salt, and a potassium salt; preferably salts of alkaline metal such as a salt of sodium hydroxide, a salt of potassium hydroxide, and a salt of lithium hydroxide; more preferably a salt of potassium hydroxide. Specific examples of salts of organic amine contained in resin include salts of volatile amine compounds such as ammonia, triethylamine, tributylamine, dimethylethanolamine, diisopropanolamine, and morpholine; and salts of high-boiling organic amine which are less likely to volatilize such as diethanolamine, triethanolamine, and the like.

Specific examples of resin of an micro-encapsulated pigment include polyvinyl-based materials such as vinyl chloride, vinyl acetate, polyvinyl alcohol, polyvinyl butyral, and the like; polyester-based materials such as alkyd resin, phthalic acid resin, and the like; amino-based materials such as melamine resin, melamine formaldehyde resin, aminoalkyd cocondensed resin, urea resin, urea-formaldehyde resin, and the like; a material having an anionic group such as thermoplastic, thermosetting, or degenerated acrylic high molecular compounds, thermoplastic, thermosetting, or degenerated epoxy-based high molecular compounds, thermoplastic, thermosetting, or degenerated polyurethane-based high molecular compounds, thermoplastic, thermosetting, or degenerated polyether-based high molecular compounds, thermoplastic, thermosetting, or degenerated polyamide-based high molecular compounds, thermoplastic, thermosetting, or degenerated unsaturated-polyester-based high molecular compounds, thermoplastic, thermosetting, or degenerated phenolic high molecular compounds, thermoplastic, thermosetting, or degenerated silicon-based high molecular compounds, thermoplastic, thermosetting, or degenerated fluorine-based high molecular compounds, and copolymers or mixtures thereof.

Resin of the micro-encapsulated pigment may be formed by previously making a glycidyl group, an isocyanate group, a hydroxyl group, or a reactive active group such as α, β-ethylene unsaturated double bond (a vinyl group) pendant on resin, or mixing with resin a cross-linking agent having a reactive active group; e.g., melamine resin, urethane resin, epoxy resin, a photo-curing agent such as ethylene unsaturated monomer or oligomer, or the like. Resin having undergone such treatment yields advantages of the ability to further enhance characteristics of a coating wall of a pigment, such as solvent resistance, durability, or the like, and the ability to enhance the strength of a film after a coating film has been formed on a recording medium by ink.

Among the above-mentioned resins, anionic, acrylic resin is obtained by means of polymerizing monomers in a solvent; e.g., acrylic monomer having an anionic group (hereinafter called "anionic-group-containing acrylic monomer") and another monomer capable of copolymerizing with the monomer, as needed. For instance, acrylic monomer having one or more anionic groups selected from the group consisting of a carboxyl group, a sulfonic group, and a phosphonic group, is mentioned as anionic-group-containing acrylic monomer. Of these monomers, acrylic monomer having a carboxyl group is particularly preferable.

Specific examples of acrylic monomer having a carboxyl group include an acrylic acid, a methacrylic acid, a crotonic acid, an ethacrylic acid, a propyl acrylic acid, an isopropyl acrylic acid, an itaconic acid, a fumaric acid, and the like. Of these acids, an acrylic acid or a methacrylic acid is preferable. Specific examples of acrylic monomer having a sulfonic group include sulfoethyl-methacrylate, a butyl-acrylic-amide-sulfonic acid, and the like. Specific examples of acrylic monomer having a phosphonic group include phosphoethylmethacrylate, and the like.

Specific examples of other monomers capable of copolymerizing with anionic-group-containing acrylic monomer include (meta) ester acrylate such as methyl acrylate, ethyl acrylate, isopropyl acrylate, acrylate-n-propyl, acrylate-n-butyl, acrylate-t-butyl, acrylate-2-ethylhexyl, acrylate-n-octyl, lauryl acrylate, benzyl acrylate, methyl methacrylate, ethyl methacrylate, isopropyl methacrylate, methacrylate-n-propyl, methacrylate-n-butyl, isobutyl methacrylate, methacrylate-t-butyl, methacrylate-2-ethylhexyl, methacrylate-n-octyl, lauryl methacrylate, stearyl methacrylate, tridecyl methacrylate, benzyl methacrylate, and the like; an additional reactant formed from oil fatty acid and (meta) acrylic ester monomer having an oxirane, such as an additional reactant formed from a stearic acid and glycidyl methacrylate; an additional reactant formed from an oxirane compound including an alkyl group having three carbon atoms or more and a (meta) acrylic acid; a styrene-based monomer such as styrene, α-methylstyrene, o-methylstyrene, m-methylstyrene, p-methylstyrene, p-tert-butylstyrene, and the like; itaconate ester such as itaconic benzyl, and the like; maleate ester such as dimethyl maleate, and the like; fumaric ester such as fumaric diethyl fumarate and the like; acrylonitrile, methacrylonitrile, vinyl acetate, isobornyl acrylate, isobornyl methacrylate, aminoethyl acrylate, aminopropyl acrylate, methylaminoethyl acrylate, methylaminopropyl acrylate, ethylaminoethyl acrylate, ethylaminopropyl acrylate, aminoethylamide acrylate, aminopropylamide acrylate, methylaminoethylamide acrylate, methylaminopropylamide acrylate, ethylaminoethylamide acrylate, ethylaminopropylamide acrylate, amidemethacrylate, aminoethyl methacrylate, aminopropyl methacrylate, methylaminoethyl methacrylate, methylaminopropyl methacrylate, ethylaminoethyl methacrylate, ethylaminopropyl methacrylate, aminoethylamide methacrylate, aminopropylamide methacrylate, methylaminoethylamide methacrylate, methylaminopropylamide methacrylate, ethylaminoethylamide methacrylate, ethylaminopropylamide methacrylate, hydroxymethyl acrylate, acrylate-2-hydroxyethyl, acrylate-2-hydroxypropyl, hydroxymethyl methacrylate, methacrylate-2-hydroxyethyl, methacrylate-2-hydroxypropyl, N-methylolacrylamide, allyl alcohol, and the like.

Examples of monomers having a cross-linking functional group are as follows. Polymeric monomers having a blocked isocyanate group can be readily manufactured by means of causing a known blocking agent to additionally react with a polymeric monomer having an isocyanate group such as 2-methacryloyloxymethylisocyanate. Alternatively, polymeric monomers having a blocked isocyanate group can be readily manufactured by means of causing a compound having an isocyanate group and a blocked isocyanate group to additionally react with the above-mentioned vinyl-based copolymer having a hydroxyl group and a carboxyl group. A compound having an isocyanate group and a blocked isocyanate group can be readily obtained by means of causing a di-isocyanate compound to additionally react with a known blocking agent at a mole ratio of about 1:1.

Examples of a monomer having an epoxy group include glycidyl (meta) acrylate, a (meta) acrylate monomer having an alicyclic epoxy group, and the like. Examples of a monomer having a 1,3-dioxolane-2-on-4-yl group include 1,3-dioxolane-2-on-4-ylmethyl (meta) acrylate, 1,3-dioxolane-2-on-4-ylmethylvinylether, and the like.

Examples of a polymerization initiator include a peroxide such as t-butyl-peroxybenzoate, di-t-butylperoxide, cumeneperhydrooxide, acetylperoxide, benzoylperoxide, laurolyperoxide, and the like; and an azo-compound such as azobisisobutyronitrile, azobis-2,4-dimethylvaleronitrile, azobiscyclohexanecarbonitrile, and the like.

Examples of a solvent used when an anionic-group-containing acrylic monomer is copolymerized with another monomer capable of copolymerizing with the monomer, as needed, include an aliphatic hydrocarbons solvent such as hexane, mineral spirits, and the like; an aromatic hydrocarbons solvent, such as benzene, toluene, xylene, and the like; an ester solvent such as butyl acetate; a ketone solvent such as methyl ethyl ketone, isobutylmethyl ketone, and the like; an alcohol solvent such as methanol, ethanol, butanol, isopropyl alcohol, and the like; and an aprotic polar solvent such as dimethylformamide, dimethylsulfoxide, N-methylpyrrolidone, pyridine, and the like. Two or more types of the solvents can also be used in combination.

Preferably, in the present invention, resin coating a pigment further contains a curing agent and/or a high molecular compound. More preferably, the pigment is further coated with a curing agent and/or a high molecular compound. The curing agent or the high molecular compound acts so as to cure a coating film of a coloring agent or enhance the strength of a coating film when the curing agent or the high molecular compound is used in ink.

Specific examples of a curing agent employed in the present invention comprise amino resin such as melamine resin, benzoguanamine resin, urea resin, and the like; phenolic resin such as trimethylolphenol, condensates thereof, and the like; polyisocyanate such as tetramethylene-diisocyanate (TDI), hexamethylene-di-isocyanate (HDI), diphenyl-methane-diisocyanate (MDI), naphthalene-diisocyanate (NDI), isophorone-diisocyanate (IPDI), xylene-diisocyanate (XDI), transformed isocyanate thereof or blocked isocyanate thereof, and the like; amines such as aliphatic amine, aromatic amine, N-methylpiperazine, triethanolamine, morpholine, dialkylamino ethanol, benzyldimethylamine, and the like; acid anhydrides such as a polycarboxylic acid, phthalic anhydride, maleic anhydride, hexahydrophthalic anhydride, pyromellitic dianhydride, benzophenonetetracarboxylic anhydride, ethyleneglycolbis-trimellitate, and the like; epoxy compounds such as bisphenol-A epoxy resin, phenolic epoxy resin, glycidyl methacrylate copolymer, glycidyl ester resin of carboxylic acid, alicyclic epoxy, and the like; alcohols such as polyetherpolyol, polybutadiene glycol, polycaprolactonepolyol, trishydroxyethylisocyanate (THEIC), and the like; and vinyl compounds such as a polyvinyl compound serving as an unsaturated-group-containing compound used for radical curing, UV curing, or electron curing induced by peroxide, a polyallyl compound, a reactant formed from glycol, polyol, an acrylic acid, a methacrylic acid, or the like.

More preferably, an attempt is made to accelerate curing by means of addition of a photoinitiator, a polymerization initiator, or a catalyst. Examples of the photoinitiator include benzoins, anthraquinones, benzophenones, a sulfur-containing compound, dimethylbenzylketal, and the like. However, the photoinitiator is not limited to them. Examples of the polymerization initiator include peroxides such as t-butylperoxidebenzoate, di-t-butylperoxide, cumeneperhydroxide, acetylperoxide, benzoylperoxide, lauroylperoxide, and the like; and an azo-compound such as azobisisobutyronitrile, azobis-2,4-dimethylvaleronitrile, azobiscyclohexanecarbonitrile, and the like. examples of the catalyst include Co compounds, Pb compounds, and the like.

In relation to high molecular compounds that can be used in the present invention, any high molecular compound can be used without particular limitations, so long as the compound has a number-average molecular weight of 1,000 or more. A number-average molecular weight preferably ranges from 3,000 to 100,000 in terms of the strength of an ink film and manufacture of a pigment coating film.

No specific limitations are imposed on the type of high molecular compounds. Examples of the high molecular compounds include polyvinyl-based materials such as vinyl chloride, vinyl acetate, polyvinyl alcohol, polyvinyl butyral, and the like; polyester-based materials such as alkyd resin, phthalic acid resin, and the like; amino-based materials such as melamine resin, melamine formaldehyde resin, aminoalkyd cocondensed resin, urea resin, urea-formaldehyde resin, and the like; and high molecular compounds including thermoplastic, thermosetting, or degenerated acrylic high molecular compounds, thermoplastic, thermosetting, or degenerated epoxy-based high molecular compounds, thermoplastic, thermosetting, or degenerated polyurethane-based high molecular compounds, thermoplastic, thermosetting, or degenerated polyether-based high molecular compounds, thermoplastic, thermosetting, or degenerated polyamide-based high molecular compounds, thermoplastic, thermosetting, or degenerated unsaturated-polyester-based high molecular compounds, thermoplastic, thermosetting, or degenerated phenolic high molecular compounds, thermoplastic, thermosetting, or degenerated silicon-based high molecular compounds, thermoplastic, thermosetting, or degenerated fluorine-based high molecular compounds, and copolymers or mixtures thereof.

Manufacture of a Micro-Encapsulated Pigment

A micro-encapsulated pigment can be manufactured by use of the above-mentioned components and by means of a conventional physical method or a conventional chemical method. According to a preferred mode of the present invention, the micro-encapsulated pigment can be manufactured by means of the methods described in JP-A-9-151342, JP-A-10-140065, JP-A-11-209672, JP-A-11-172180, JP-A-10-25440, and JP-A-11-43636. Manufacturing methods described in these publications are briefly described hereunder.

A "phase inversion method" and an "acid analysis method" are described in JP-A-9-1513142 and JP-A-10-140065.

a) "Phase Inversion Method"

In the present invention, a "phase inversion method" basically refers to a self-dispersion (phase inversion emulsification) method which disperses into water a mixed melt substance consisting of a pigment and resin having self-dispersing capability or dissolution capability. Alternatively, a mixed melt substance may contain the curing agent or the high molecular compound. The term "mixed melt substance" means a substance in a mixed-but-undissolved state, a substance in a dissolved-and-mixed state, a substance in a mixed-but-undissolved state, and a substance in a dissolved-and-mixed state.

b) "Acid Analysis Method"

In the present invention, the "acid analysis method" refers to a method for manufacturing a micro-encapsulated pigment by means of preparing a hydrated cake from resin and a pigment, and neutralizing some or all of anionic groups contained in resin of the hydrated cake, by use of a basic compound.

The "acid analysis method" specifically comprises (1) a step of making an attempt to gel resin by means of dispersing resin and a pigment into an alkaline aqueous medium and subjecting the liquid mixture to heating treatment, as required; (2) a step of rendering a pH level of the gel neutral or acidic, to thus make resin hydrophobic and cause the resin to intensively adhere to the pigment; (3) a step of subjecting the pigment to filtering and cleansing as required, to thus produce a hydrated cake; (4) a step of neutralizing some or all of anionic groups contained in resin of the hydrated cake, by use of a basic compound, and re-dispersing the cake into an aqueous medium; and (5) a step of subjecting the liquid mixture to heating treatment as required, to thus make an attempt to gel resin. More specific manufacturing methods of the "Phase Inversion Method" and the "Acid Analysis Method" may be analogous to those described in JP-A-9-151342 and JP-A-10-140065.

A method for manufacturing a coloring agent is described in JP-A-11-209672 and JP-A-11-172180. The general features of the manufacturing method are basically formed from manufacturing steps provided below.

Namely, the manufacturing steps comprise (1) a step of mixing a basic compound with resin having anionic groups or a solution prepared by dissolving the resin in an organic solvent, to thus neutralize the mixture; (2) a step of mixing a pigment with the liquid mixture and suspending the liquid mixture, and subsequently dispersing the pigment by means of a disperser or the like, to thus obtain a pigment-dispersed liquid; (3) distilling a solvent as required to thus remove the solvent; (4) a step of adding an acidic compound to the mixture to thus deposit resin having anionic groups, thereby coating the pigment with the resin having anionic groups; (5) a step of subjecting the pigment to filtering and cleansing as required; and (6) a step of adding a basic compound to the mixture to thus neutralize the anionic groups of resin having the anionic groups and to thereby disperse the resin into an aqueous medium and generate an aqueous dispersoid. A more specific manufacturing method may be analogous to that described in JP-A-11-2096722 and JP-A-11-172180.

In relation to pigments usable in the present invention, examples of a pigment for yellow ink include CI Pigment Yellow-1, CI Pigment Yellow-2, CI Pigment Yellow-3, CI Pigment Yellow-4, CI Pigment Yellow-5, CI Pigment Yellow-6, CI Pigment Yellow-7, CI Pigment Yellow-10, CI Pigment Yellow-11, CI Pigment Yellow-12, CI Pigment Yellow-13, CI Pigment Yellow-14, CI Pigment Yellow-14C, CI Pigment Yellow-16, CI Pigment Yellow-17, CI Pigment Yellow-24, CI Pigment Yellow-34, CI Pigment Yellow-35, CI Pigment Yellow-37, CI Pigment Yellow-42, CI Pigment Yellow-53, CI Pigment Yellow-55, CI Pigment Yellow-65, CI Pigment Yellow-73, CI Pigment Yellow-74, CI Pigment Yellow-75, CI Pigment Yellow-81, CI Pigment Yellow-83, CI Pigment Yellow-93, CI Pigment Yellow-95, CI Pigment Yellow-97, CI Pigment Yellow-98, CI Pigment Yellow-100, CI Pigment Yellow-101, CI Pigment Yellow-104, CI Pigment Yellow-108, CI Pigment Yellow-109, CI Pigment Yellow-110, CI Pigment Yellow-114, CI Pigment Yellow-117, CI Pigment Yellow-120, CI Pigment Yellow-128, CI Pigment Yellow-129, CI Pigment Yellow-138, CI Pigment Yellow-150, CI Pigment Yellow-151, CI Pigment Yellow-153, CI Pigment Yellow-154, CI Pigment Yellow-155, and CI Pigment Yellow-180.

Examples of a pigment for magenta ink include CI Pigment Red-1, CI Pigment Red-2, CI Pigment Red-3, CI Pigment Red-4, CI Pigment Red-5, CI Pigment Red-6, CI Pigment Red-7, CI Pigment Red-8, CI Pigment Red-9, CI Pigment Red-10, CI Pigment Red-11, CI Pigment Red-12, CI Pigment Red-13, CI Pigment Red-14, CI Pigment Red-15, CI Pigment Red-16, CI Pigment Red-17, CI Pigment Red-18, CI Pigment Red-19, CI Pigment Red-21, CI Pigment Red-22, CI Pigment Red-23, CI Pigment Red-30, CI Pigment Red-31, CI Pigment Red-32, CI Pigment Red-37, CI Pigment Red-38, CI Pigment Red-39, CI Pigment Red-40, CI Pigment Red-48(Ca), CI Pigment Red-48 (Mn), CI Pigment Red-48:2, CI Pigment Red-48:3, CI Pigment Red-48:4, CI Pigment Red-49, CI Pigment Red-49:1, CI Pigment Red-50, CI Pigment Red-51, CI Pigment Red-52, CI Pigment Red-52:2, CI Pigment Red-53:1, CI Pigment Red-53, CI Pigment Red-55, CI Pigment Red-57(Ca), CI Pigment Red-57:1, CI Pigment Red-60, CI Pigment Red-60:1, CI Pigment Red-63:1, CI Pigment Red-63:2, CI Pigment Red-64, CI Pigment Red-64:1, CI Pigment Red-81, CI Pigment Red-83, CI Pigment Red-87, CI Pigment Red-88, CI Pigment Red-89, CI Pigment Red-90, CI Pigment Red-101 (iron oxide red), CI Pigment Red-104, CI Pigment Red-105, CI Pigment Red-106, CI Pigment Red-108 (cadmium red), CI Pigment Red-112, CI Pigment Red-114, CI Pigment Red-122 (Quinacridone magenta), CI Pigment Red-123, CI Pigment Red-146, CI Pigment Red-149, CI Pigment Red-163, CI Pigment Red-166, CI Pigment Red-168, CI Pigment Red-170, CI Pigment Red-172, CI Pigment Red-177, CI Pigment Red-178, CI Pigment Red-179, CI Pigment Red-184, CI Pigment Red-185, CI Pigment Red-190, CI Pigment Red-193, CI Pigment Red-202, CI Pigment Red-209, CI Pigment Red-219, and the like. Particularly, CI Pigment Red-122 is preferable.

Examples of a pigment for cyan ink include CI Pigment Blue-1, CI Pigment Blue-2, CI Pigment Blue-3, CI Pigment Blue-15, CI Pigment Blue-15:1, CI Pigment Blue-15:2, CI Pigment Blue-15:3, CI Pigment Blue-15:34, CI Pigment Blue-16, CI Pigment Blue-17:1, CI Pigment Blue-22, CI Pigment Blue-25, CI Pigment Blue-56, CI Pigment Blue-60, CI Vat Blue-4, CI Vat Blue-60, and CI Vat Blue-63. Particularly, CI Pigment Blue-15:3 is preferable.

Examples of pigments for other colors of ink include CI Pigment Orange-5, CI Pigment Orange-13, CI Pigment Orange-16, CI Pigment Orange-17, CI Pigment Orange-36, CI Pigment Orange-43, CI Pigment Orange-51; CI Pigment Green-1, CI Pigment Green-4, CI Pigment Green-7, CI Pigment Green-8, CI Pigment Green-10, CI Pigment Green-17, CI Pigment Green-18, CI Pigment Green-36; CI Pigment Violet-1 (RHODAMINE Lake), CI Pigment Violet-3, CI Pigment Violet-5:1, CI Pigment Violet-16, CI Pigment Violet-19 (Quinacridone red), CI Pigment Violet-23, CI Pigment Violet-38, and the like. In addition, a processed pigment, such as graft carbon produced by processing the surface of a pigment with resin, can also be employed.

For example, carbon black can be mentioned as a black color pigment. Specific examples of carbon black include No. 2300, No. 900, MCF88, No. 33, No. 40, No. 45, No. 52, MA7, MA8, MA100, and No. 2200B, and the like, all of which are manufactured by Mitsubishi Chemical Corporation; Raven 5750, Raven 5250, Raven 5000, Raven 3500, Raven 1255, Raven 700, and the like, all of which are manufactured by Columbian Chemicals Company; Regal 400R, Regal 330R, Regal 660R, Mogul L, Monarch 700, Monarchy 800, Monarch 880, Monarch 900, Monarch 1000, Monarch 1100, Monarch 1300, Monarch 1400, and the like, all of which are manufactured by CABOT Corporation; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like, all of which are manufactured by Degussa Corporation.

These pigments may be used in form of a single type, or a plurality of pigments may be selected from one or more of the groups and used in combination.

[Inkjet Recording Method]

According to the inkjet recording method of the present invention, energy is supplied to ink for inkjet recording purpose, to thus form an image on a known image-receiving material; namely, plain paper or resin-coated paper; for instance, inkjet-only paper, a film, electrophotographic common-use paper, cloth, glass, metal, ceramics, and the like, described in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-10-217597, JP-A-10-337947, and the like. Descriptions ranging from paragraph number 0093 to paragraph number 0105 in JP-A-2003-306623 can be applied as the inkjet recording method of the present invention.

During formation of an image, with a view toward imparting a glossing characteristic and waterproofing to an image-receiving material and enhancing weatherability of the same, a polymer latex compound may also be used in combination. Timing when a latex compound is imparted to an image-receiving material may be before or after imparting of a coloring agent to the material, or a latex compound may be imparted to the material simultaneously with the coloring agent. Consequently, a latex compound may be added to an image-receiving material or ink, or may be used in the form of a liquefied substance consisting solely of polymer latex. Specifically, methods described in JP-A-2002-166638 (Japanese Patent Application No. 2000-363090), JP-A-2002-121440 (Japanese Patent Application No. 2000-315231), JP-A-2002-154201 (Japanese Patent Application No. 2000-354380), JP-A-2002-144696 (Japanese Patent Application No. 2000-343944), and JP-A-2000-080759 (Japanese Patent Application No. 2000-268952) can be preferably used.

Occurrence of a bronzing phenomenon can be prevented by means of adding, to a dispersed pigment of the present invention, a colorless aqueous plane compound having ten or more nonlocalized π electrons in one molecule. The bronzing phenomenon is a phenomenon in which, in a case where a recorded image of high optical density is formed, crystal of a pigment being deposited on the surface of a recording material as an image becomes dry, whereby the recorded image reflects light to thus exhibit metallic luster. This phenomenon tends to easily arise when a water solubility of a pigment is reduced or a hydrogen bonding group is introduced into the structure of a pigment in order to enhance waterproofing, radiationproofing, and gasproofing of an image-receiving material.

Since light is reflected or scattered by means of occurrence of a bronzing phenomenon, a great change in the hue of a recorded image from a desired hue level and loss of transparency as well as a decrease in optical density of a recorded image arise. For these reasons, inhibition of occurrence of a bronzing phenomenon is an important characteristic required of ink for inkjet purposes.

A colorless aqueous plane compound having ten or more nonlocalized π electrons in one molecule, which is preferably used in the present invention, will now be described. In many cases, the number of π electrons constituting a nonlocalized π electron system increases, and absorption arises in a visible range as the π electron system expands. The term "colorless" of the present invention includes a state where a compound is minimally colored to such an extent that an image is not affected by the color. The colorless aqueous plane compound may also be a fluorescent compound. However, a nonfluorescent compound is preferable; a compound whose λmax of an absorption peak at the lowest frequency side is 350 nm or less and whose mol absorption coefficient is 10,000 or less is more preferable; and a compound whose λmax of an absorption peak at the lowest frequency side is 320 nm or less and whose mol absorption coefficient is 10,000 or less is particularly preferable.

The compound has ten or more nonlocalized π electrons in one molecule. Although no particular limitations are imposed on the maximum number of π electrons, 80 π electrons or less are preferable, 50 π electrons or less are more preferable, and 30 π electrons or less are particularly preferable. 10 π electrons or more may form one large nonlocalized system, or may form two or more nonlocalized systems. Particularly, a compound having two or more aromatic rings in one molecule is preferable. The aromatic ring may be an aromatic hydrocarbon ring or an aromatic heterocycle including hetero atoms, or a ring which is subjected to annelation to thus form a single aromatic ring. Examples of the aromatic ring include benzene, naphthalene, anthracene, pyridine, pyrimidine, pyrazine, triazine, and the like.

A compound which is dissolved in an amount of at least 1 g or more in 100 g of water at 20° C. is preferable as the aqueous plane compound preferably employed in the present invention. A compound which is dissolved in an amount of 5g or more in 100 g of water at 20° C. is more preferable. A compound which is dissolved in an amount of 10 g or more in 100 g of water at 20° C. is particularly preferable.

In the case of a compound having two or more aromatic rings in one molecule, the compound particularly preferably has at least two solubilization groups bonded to an aromatic ring in the molecule. Examples of a useful solubilization group include a sulfonic group, a carboxyl group, a hydroxy group, a phosphonic group, a carbonamide group, a sulfonamide group, a quaternary ammonium salt, and other groups which are obvious to the person skilled in the art. However, the useful solubilization group is not limited to the groups mentioned above. Of these groups, the sulfonic group and the carboxyl group are preferable, and the sulfonic group is most preferable.

The maximum number of solubilization groups in a molecule is limited only by the number of locations of available substitutional groups. For practical purposes, presence of 10 identical or different solubilization groups in a molecule is sufficient. No limitations are imposed on counter cations of these solubilization groups. Alkaline metal, ammonium, and organic cations (tetramethylammonium, guanidinium, pyridinium, and the like) can be mentioned as counter cations. Of these counter cations, alkaline metal and ammonium are preferable. Particularly, lithium, sodium, potassium, and ammonium are preferable. Lithium, sodium, and ammonium are most preferable.

Specific compounds include those described in JP-A-63-55544, JP-A-3-146947, JP-A-3-149543, JP-A-2001-201831, JP-A-2002-139822, JP-A-2002-196460, JP-A-2002-244257, JP-A-2002-244259, JP-A-2002-296743, JP-A-2002-296744, JP-A-2003-255502, JP-A-2003-307823, JP-A-2004-4500, JP-A-2004-170964, and specifications thereof.

Compounds represented by formula V1 provided below are preferably used.

Formula VI:

A-X-L-(Y-B)$_n$

In the formula, A, L, B each independently represents aromatic groups (an aryl group and an aromatic heterocyclic group), respectively. X and Y each independently represents bivalent bonding groups. In the formula, "n" represents 0 or 1. The aromatic group may be a monocyclic ring or a condensed ring. The bivalent bonding group includes an alkylene group, an alkenyne group, —CO—, -So$_n$-(n represents 0, 1, 2), —NR—(R represents a hydrogen atom, an alkyl group, an aryl group, and a heterocyclic group), —O—, and bivalent groups formed by combination of these bonding groups. A compound represented by the formula VI contains at least an ionic hydrophilic group selected from a sulfonic group, a carboxyl group, a phenolic hydroxyl group, and a phosphonic group. These ionic hydrophilic groups may assume the form of a salt. No limitations are imposed on counter cations thereof. Alkaline metal, ammonium, organic cations (tetramethylammonium, guanidinium, pyridinium, and the like) can be mentioned as counter cations. Of these counter cations, alkaline metal and ammonium are preferable; lithium, sodium, potassium, and ammonium are particularly preferable; and lithium, sodium, and ammonium are most preferable.

The compound represented by the formula VI may have a substitutional group other than an ionic hydrophilic group. Specific substitutional groups include an alkyl group, an allyl group, an aralkyl group, a heterocyclic group, an alkoxy group, an alkoxyl group, an aryloxy group, a hydroxyl group, an amino group (including an anilino group and a heterocyclic amino group), an acyl group, an acylimino group, an ureido group, a halogen atom, a sulfamoyl group, a carbamoyl group, a sulfonamide group, a sulphonyl group, a sulfenyl group, a sulfinyl group, and the like. These substitutional groups may additionally have another substitutional group. Of the compounds represented by formula V1, a compound acquired when n=1 is substituted into the formula is preferable. Further, compounds acquired when at least one of A, L, and B is an aromatic heterocycle are preferable. Moreover, compounds containing two to four ionic hydrophilic groups are preferable.

Typical compounds (deflocculation agents) are provided as follows:

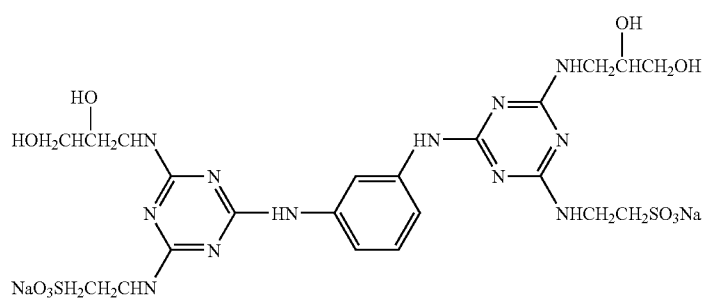

P-1

-continued
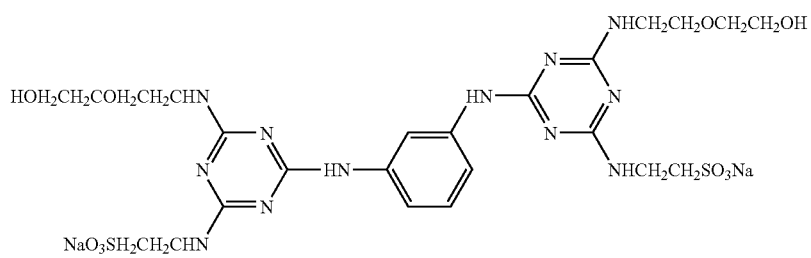
P-2
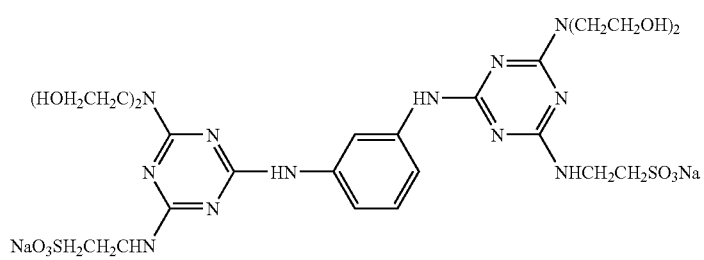
P-3
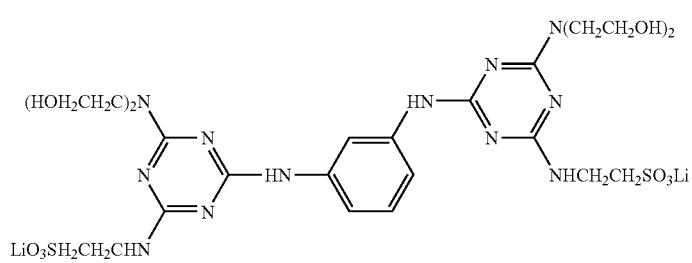
P-4
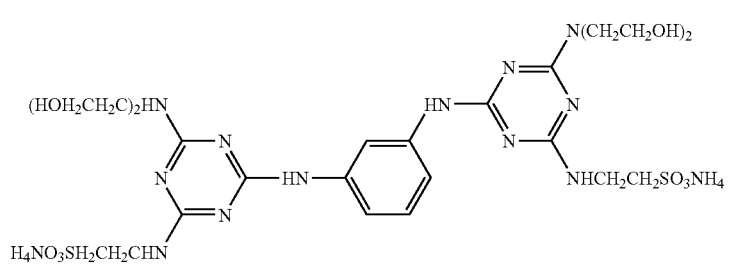
P-5
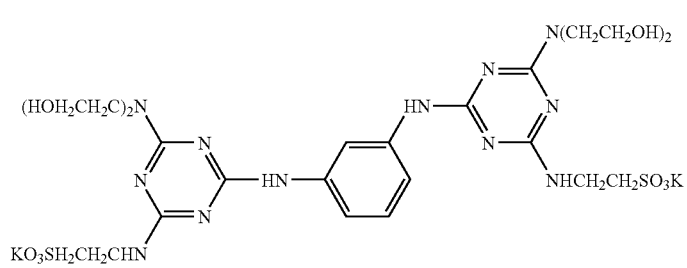
P-6
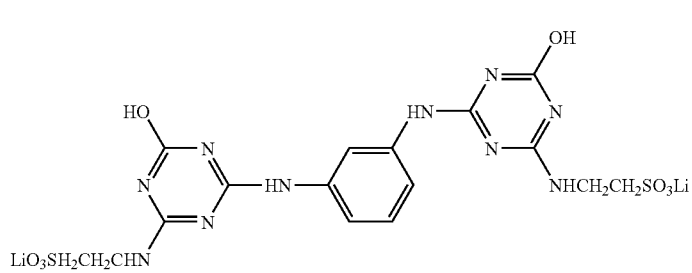
P-7

-continued
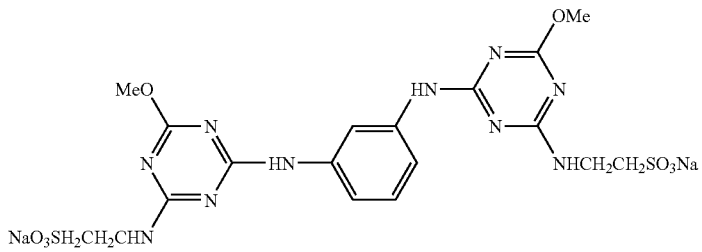
P-8
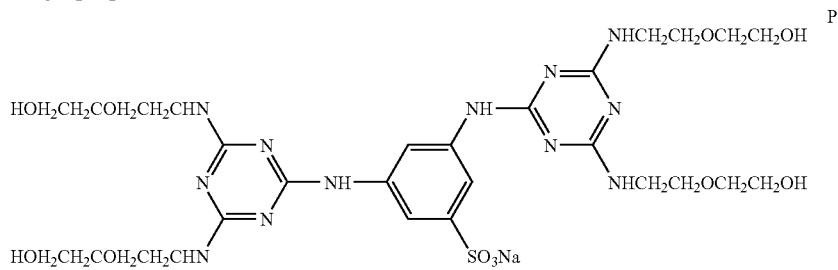
P-9
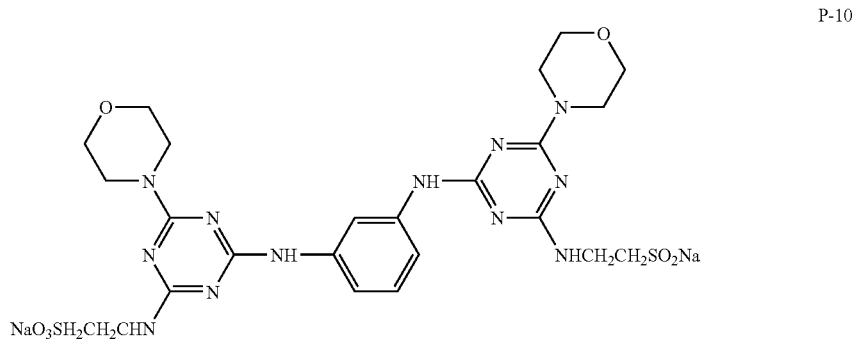
P-10
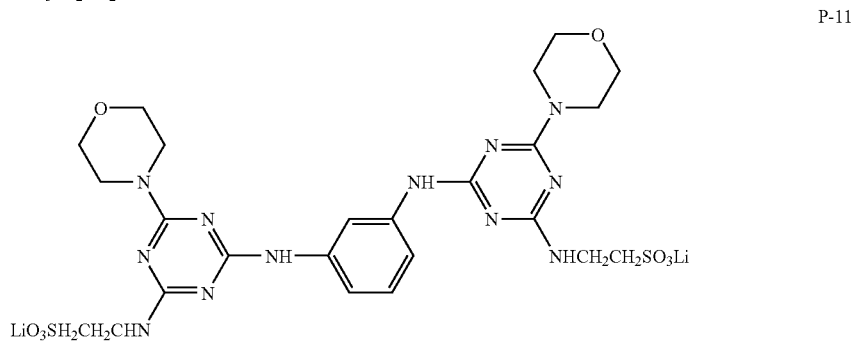
P-11
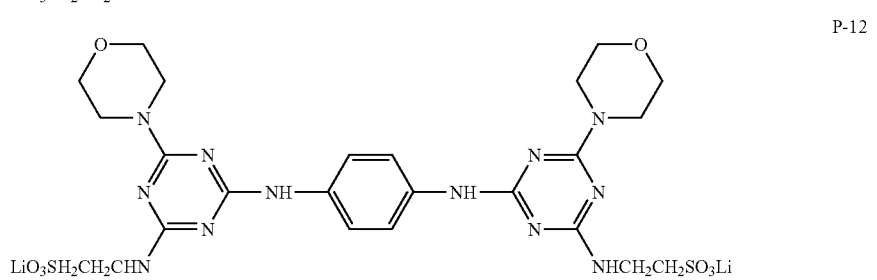
P-12
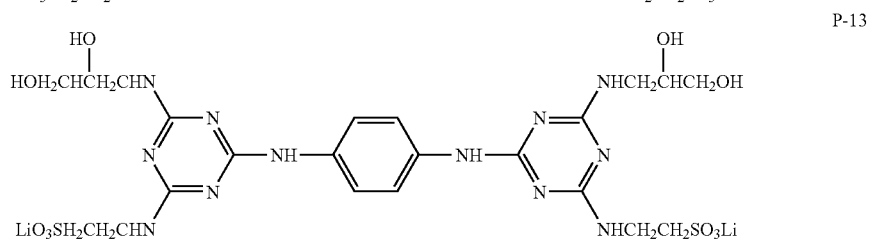
P-13

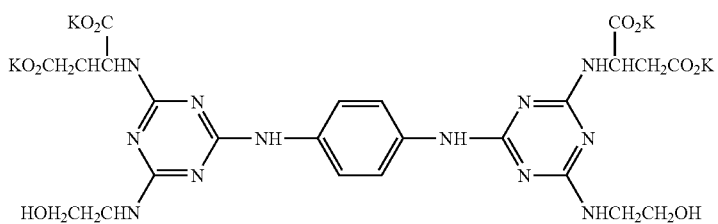

P-14

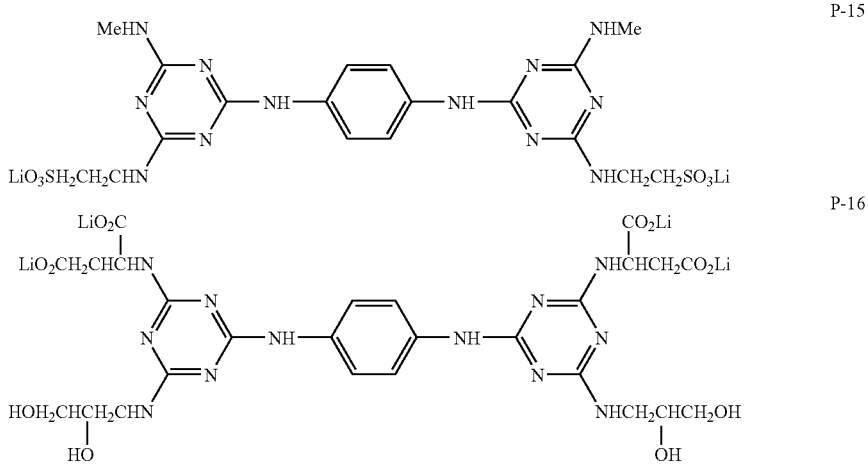

P-15

P-16

Ink for inkjet purpose can be manufactured by means of dissolving and/or dispersing a pigment into a lipophilic medium or an aqueous medium. When an aqueous medium is used, another additive is contained, as required, within a range where the advantage of the present invention is not impaired.

Other additives include known additives; e.g., a desiccation inhibitor (a wetting agent), a discoloration inhibitor, an emulsion stabilizer, a permeation promoter, an ultraviolet absorber, an antiseptic agent, an antifungal agent, a pH controlling agent, a surface tension controlling agent, an antifoamer, a viscosity modifier, a dispersing agent, a dispersion stabilizer, a rust-preventive agent, a chelating agent, and the like. Additives of these types are added directly to an ink fluid in the case of water-soluble ink. When an oil-soluble dye is used in the form of a dispersed substance, the dye is generally added to a dispersed substance generated after preparation of a dye disperse substance. However, the dye may also be added to an oil phase or a water phase during preparation.

The desiccation inhibitor is preferably used for the purpose of preventing occurrence of a clog, which would otherwise be caused when the ink for inkjet purpose is desiccated at an ink ejection nozzle used for an inkjet recording system. A water-soluble organic solvent which is lower than water in terms of vapor pressure is preferable as the desiccation inhibitor. Specific examples of the desiccation inhibitor include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylenic glycol derivatives, glycerin, trimethylolpropane, and the like; lower alkyl ethers of polyhydric alcohols including ethylene glycol monomethyl (or ethyl) ether, diethyleneglycolmonomethyl (or ethyl) ether, triethyleneglycolmonoethyl (or butyl) ether, and the like; heterocycles including 2-pyrolidone, N-methyl-2-pyrolidone, 1,3-dimethyl-2-imidazolidinone, N-ethylmorpholine, and the like; sulfur-containing compounds including sulfolane, dimethylsulfoxide, 3-sulfolene, and the like; multifunctional compound including diacetone alcohol, diethanolamine, and the like. Of these organic solvents, polyhydric alcohols including glycerin, diethyleneglycol, and the like; and ureas, are more preferable. The desiccation inhibitor may be used alone, or two types of desiccation inhibitors or more may be used in combination. These desiccation inhibitors are preferably contained in ink in an amount of 10 to 50 mass percent.

The permeation promoter is preferably used for the purpose of causing inkjet ink to well permeate through paper. As the permeation promoter, there can be used alcohols such as ethanol, isopropanol, butanol, di (tri) ethyleneglycolmonobutylether, 1,2-hexanediol, and the like; as well as sodium lauryl sulfate, sodium oleate, a nonionic surface active agent, and the like. When the permeation promoter is contained in ink in an amount of 5to 30 mass percent, a sufficient advantage is usually yielded. Preferably, the permeation promoter is used in a range where blotting of ink in printed letters or a print-through phenomenon is not induced.

The ultraviolet absorber is used for the purpose of enhancing the holding characteristics of an image. Examples of the ultraviolet absorber include benzotriazole-based compounds described in JP-A-58-185677, JP-A-61-190537, JP-A-2-782, JP-A-5-197075, JP-A-9-34057, and like compounds; benzophenone-based compounds described in JP-A-46-2784, JP-A-5-194483, U.S. Patent No. 3214463, and like compounds; cinnamic compounds described in JP-A-48-30492, JP-A-56-21141, JP-A-10-88106, and like compounds; triazine-based compounds described in JP-A-4-298503, JP-A-8-53427, JP-A-8-239368, JP-A-10-182621, JP-UM-T-8-501291, and like compounds; and compounds described in Research Disclosure No. 24239 and compounds which absorb UV radiation and emit fluorescence, so-called fluorescent brightening agents, and which are typified by a stilbene-based compound and a benzoxazole-based compound.

The discoloration inhibitor is used for the purpose of enhancing the storage characteristics of an image. Various types of organic-based and metal-based complexes can be used the discoloration inhibitor. Examples of the organic discoloration inhibitors include hydroquinones, alkoxyphenols, dialkoxyphenols, phenols, anilines, amines, indans, chromans, alkoxy anilines, heterocycles, and the like. Examples of the metal complexes include nickel complex, zinc complex, and the like. More specifically, There can be used examples of the metal complexes including compounds described in Sections I to J of VII in Research Disclosure No. 17643, compounds described in Research Disclosure No. 15162, compounds described in the left column on pg. 650 in Research Disclosure No. 18716, those described on pg. 527 in Research Disclosure No. 36544, those described on pg. 872in Research Disclosure No. 307105, compounds described in Patent cited in Research Disclosure No. 15162, and compounds belong to a formula of a typical compounds and compound examples described in pp. 127 to 137 of JP-A-62-215272.

Examples of an antifungal agent include sodium dehydroacetate, sodium benzoate, sodium pyridinethione-1-oxide, p-hydroxyethylesterbenzoate, 1,2-benzoisothiazoline-3-ON, and salts thereof. Preferably, the antifungal agent is used in an amount of 0.02 to 1.00 mass percent.

The neutralizer (an organic base, inorganic alkaline) can be used as a pH controlling agent. The pH controlling agent is added in such a way that inkjet ink assumes a pH value of 6 to 10, and more preferably a pH value of 7 to 10.

Examples of the surface tension controlling agent include a nonionic surface active agent, cationic surfactants, anionic surfactants, and betainic surfactants. In order to well squirt ink droplets by means of inkjet action, a preferred amount of surface tension controlling agent to be added is one at which surface tension of ink of the present invention is adjusted so as to assume a value of 20 to 60 mN/m, more preferably 20 to 45 mN/m, further more preferably 25 to 40 mN/m. Preferred examples of surfactants include hydrocarbon-based surfactants, including anionic surfactants and nonionic surfactants. Examples of the anionic surfactants include fatty acid salts, alkylsulfate ester salts, alkylbenzenesulfonates, alkylnaphthalenesulfonates, dialkyl sulfosuccinates, alkyl phosphates, alkyl benzene sulfonates, alkyl phosphates, condensation products of salts of naphthalenesulfonic acid with formalin, polyoxyethylene alkylsulfate ester salts, and the like. Examples of the nonionic surfactants include polyoxyethylene alkyl ether, polyoxyethylene alkyl aryl ether, polyoxyethylene fatty acid ester, sorbitan fatty acid ester, polyoxyethylene sorbitan fatty acid ester, polyoxyethylene alkylamine, fatty acid ester of glycerin, oxyethylene oxypropylene block polymer, and the like. Further, SURFAYNOLS (Air Products & Chemicals Corporation), which is an acetylenic polyoxyethylene oxide surfactant, is also preferably used. In addition, ampholytic surfactants of amine oxide type, such as N,N-dimethyl-N-alkylamineoxyde, are also preferable. Further, surfactants described in pp. (37) to (38) of JP-A-58-157636 and those described in Research Disclosure No. 30819 (1989) can also be used. Fluorochemical (alkyl-fluoride-based) surfactants and silicone surfactants, which are described in JP-A-2003-322926, JP-A-2004-325707, and JP-A-2004-309806, can also be used. These surface tension controlling agents can also be used as antifoamers, and Fluorochemical compounds, silicone compounds, and chelating reagents typified by EDTA can also be used.

Preferred viscosity of ink for inkjet use of the present invention is 30 mPa·s or less. Moreover, the viscosity is preferably adjusted to a value of 20 mPa·s or less. An aqueous medium contains water as the principal component, and a mixture to which a water-miscible organic solvent is added can be used. Examples of water-miscible organic solvents include alcohols (e.g., methanol, ethanol, propanol, isopropanol, butanol, isobutanol, sec-butanol, t-butanol, pentanol, hexanol, cyclohexanol, benzyl alcohol); polyhydric alcohols (e.g., ethylene glycol, diethylene glycol, triethyleneglycol, polyethylene glycol, propyleneglycol, dipropyleneglycol, polypropyleneglycol, butyleneglycol, hexanediol, pentanediol, glycerin, hexanetriol, and thiodiglycol); glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, ethylene glycol monomethyl ether acetate, triethylene glycol monomethyl ether, triethylene glycol monoethyl ether, and ethylene glycol monophenyl ether); amines (e.g., ethanol amine, diethanol amine, triethanol, amine, N-methylethanolamine, N-ethyldiethanolamine, morpholine, N-ethylmorpholine, ethylenediamine, diethylenetriamine, triethylene tetramine, polyethylene imine, and tetramethylepropylenediamine); and other polar solvents (e.g., formamide, N,N-dimethyleformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Two or more types of water-miscible organic solvents may be used in combination.

The ink for inkjet use of the present invention can be used for forming a full-color image. In order to form a full-color image, magenta color ink, cyan color ink, and yellow color ink can be used. In order to adjust color tones, black color ink may also be added to the ink. Further, colors of ink other than yellow, magenta, and cyan colors; namely, red color ink, green color ink, blue color ink, white color ink, and special colors of ink employed in a so-called printing field, and the like, can be used.

An inkjet recorder preferably used in the present invention will be described. An inkjet recorder 10 shown in FIG. 1 is equipped with a recording head 12 which emits ink to a sheet 11 to thus cause ink to adhere to the sheet and record an image. The recording head 12 has a plurality of nozzles, each of which is provided with an ejection port used for ejecting ink. An ejection plane where the ejection ports of the plurality of nozzles are arranged is arranged so as to oppose a recording plane of the sheet 11. The recording head 12 is attached to a carriage 13 which is movable with reference to a widthwise direction (a main scanning direction X) of the sheet 11. The ejection plane is exposed from an opening formed in the bottom surface of the carriage 13. The recording head 12 performs line recording to thus record an image while being reciprocally actuated along the widthwise direction of the sheet 11 in association with movement of the carriage 13. Every time the recording head 12 performs a round trip, the sheet 11 is fed in a sub-scanning direction Y by means of an unillustrated transport roller by an amount corresponding to a width where recording is performed by means of a single round trip of the recording head 12. An image of one screen is recorded through repetition of these operations.

The carriage 13 is slidably attached to guide rods 14a, 14b, and is driven by a belt mechanism 18 formed from a belt 16 and a pair of pulleys 17. In the carriage 13, four ink cartridges 21 housing, e.g., four colors of ink Y, M, C, K, are removably attached to a position above the recording head 12. A plurality of slots into which the respective ink cartridges 21 are to be inserted are formed in the carriage 13.

Lower surfaces of the ink cartridges 21 are attached to floor faces of the slots. When the ink cartridges 21 are attached to the carriage 13, the ink cartridges 21 and the recording head 12 are connected together by way of ink supply passages. Diaphragms, which are actuated by means of a piezoelectric element, are provided in the recording head 12 so as to correspond to the respective nozzles. Ink in the ink cartridge 21 is sucked to the nozzle by means of a change in pressure induced by vibration of the diaphragm, and is emitted from the ejection port.

During a time other than recording operation, the carriage 13 recedes to a position outside a transport path of the recording sheet 11, to thus enter a standby condition. The standby position serves as a home position of the carriage 13, and replacement of the ink cartridges 21 is performed at this home position. A head cap 26 is placed at the home position which covers the ejection plane of the recording head 12 from below to thus receive the ink having leaked out of the ejection plane. A suction plane 26a used for sucking clogged ink at the extremity of the nozzle is placed at a position opposing the ejection plane of the head cap 26. The head cap 26 is connected to an ejection failure recovery suction pump 27 which sucks the ink clogging the nozzle by way of the suction plane 21a, to thus recover an ejection failure in the recording head 12. The ink recovered by the suction pump 27 is collected by a recovery section 28.

Although FIG. 1 shows an example head of shuttle type, the present invention can be applied to a line head having a width equal to that of paper.

Figure 2:
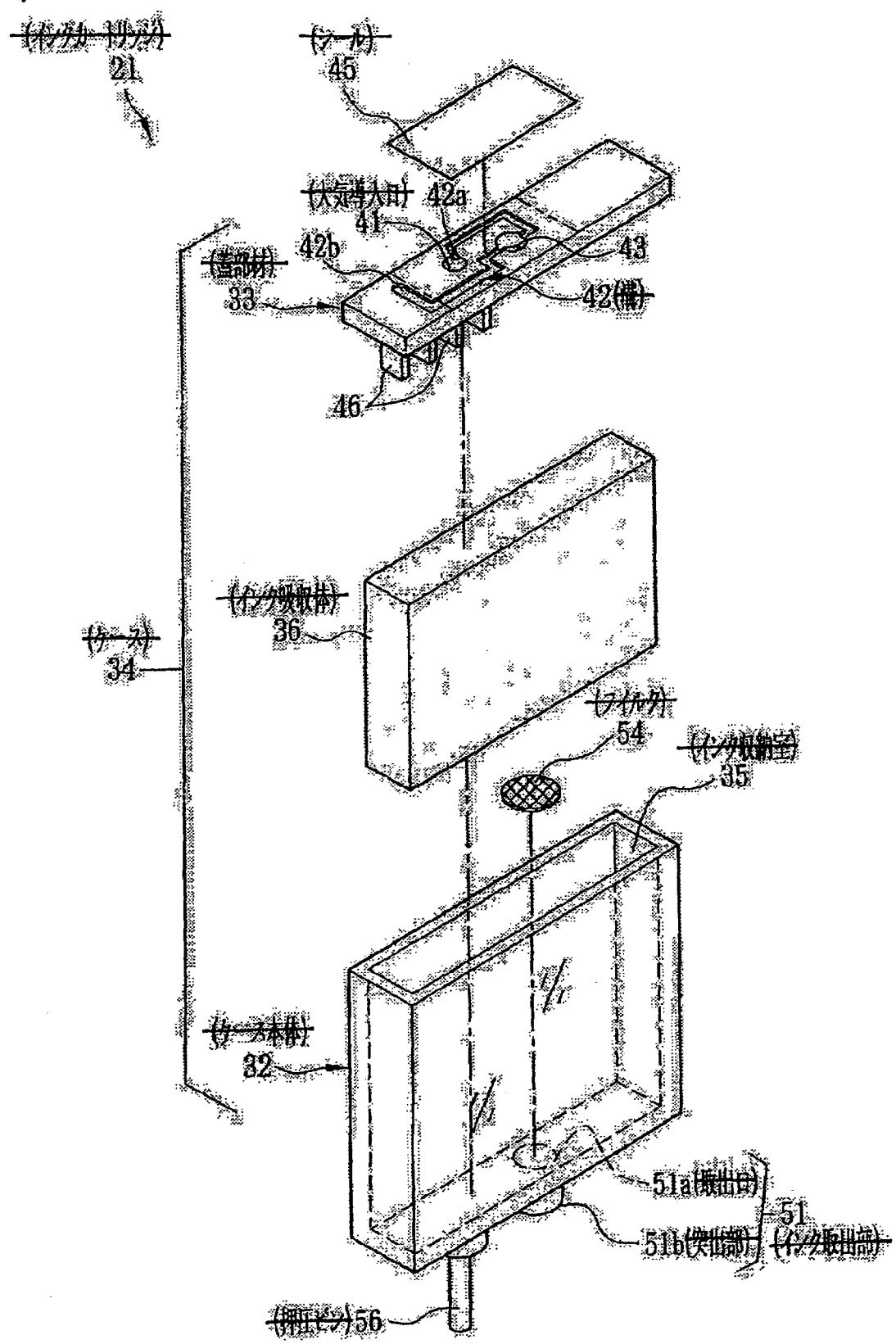
FIG. 2 is a view showing the structure of an ink cartridge used in FIG. 1.

An ink cartridge preferably used in the present invention will be described. As shown in FIG. 2, the ink cartridge 21 has a case 34 which stores ink. The case 34 comprises a case main body 32 in which is formed an ink storage chamber 35 used for storing ink; and a cap member 33 for closing an upper opening of the case main body 32. The cap member 33 is welded to the case main body 32 such that ink does not leak from the upper opening after the case main body 32 has been filled with ink. The case main body 32 is formed from, e.g., transparent plastic, and the remaining amount of ink in the ink cartridge 21 can be visually checked.

An ink absorber 36, which absorbs ink and retains it, is housed in the ink storage chamber 35. The ink absorber 35 is a spongy member including minute pores which generate capillary force. Specifically, various porous materials such as foaming agents and fibrous materials are used. In the present invention, polyolefins (resins) are preferably used. The width and depth of the ink absorber 36 are essentially identical with the width and depth of the ink storage chamber 35. The ink absorber 36 is housed while an outer peripheral surface, exclusive of an upper surface, of the ink absorber remains in contact with an inner wall of the ink storage chamber 35.

The case 34 is provided at a location above the recording head 12, and hence the weight of ink in the case 34 acts as a positive pressure against the recording head 12. The ink absorber 36 is a negative-pressure generation member which absorbs ink by means of capillary force, thereby maintaining the internal pressure of the nozzles of the recording head 12 in a negative pressure state (with reference to the atmosphere). Thus, the ink in the recording head 12 is prevented from inadvertently leaking out of the nozzles.

An atmosphere inlet port 41 is formed in the cap member 33. The atmosphere inlet port 41 takes into the ink storage chamber 35 an amount of air equal to that of consumed ink. A bent groove 42 is formed in an upper surface of the cap member 33. One end 42a of the groove 42 is connected to the atmosphere inlet port 41, and a liquid reservoir section 43 is provided in a path from the inlet port to another end 42b. A top of the groove 42 exclusive of the other end 42b (i.e., an area between two chain double-dashed lines in the drawing) is sealed with a seal 45, and only the other end 42b is exposed. When the ink in the ink storage chamber 35 has leaked out of the atmosphere inlet port 41, the groove 42 guides the ink to the liquid reservoir section 43, to thus prevent leakage of ink outside of the ink cartridge 21. Air enters the other end 42b and is guided to the atmosphere inlet port 41.

A plurality of downwardly-protruding ribs 46 are provided on a lower surface of the cap member 33. When the cap member 33 is attached to the case main body 32, the ribs 46 enter the ink storage chamber 35 and contacts the upper surface of the housed ink absorber 36, to thus push the ink absorber 36 and press the lower surface of the ink absorber against the floor of the ink storage chamber 35. Thus, a space is ensured between the ink absorber 36 and the cap member 33 by means of positioning the ink absorber 36. The ink absorber 36 is positioned by the ribs 46, and hence closing of the atmosphere inlet port 41, which would otherwise be caused as a result of positional displacement of the ink absorber 36, is prevented.

An ink output section 51, which withdraws ink from the ink storage chamber 35 and supplies the ink to the recording head 12, is provided in the lower surface of the case 34. The ink output section 51 comprises, for example, an essentially-circular output port 51a formed in the bottom of the case 34, and a cylindrical projection section 51b downwardly projecting from the output port 5a. An essentially-plate-like filter 54 is placed at the position of the output port 51a in the floor of the ink storage chamber 35. A lower surface (exposed surface) 54a is exposed from the filter 54 through the output port 51a.

The filter 54 is a mesh filter where a plurality of pores are arranged in the pattern of a mesh, and filtrates the ink output to the outside by way of the output port 51a. This filter 54 prevents inflow of, e.g., ink having coagulated in the ink storage chamber 35 or extraneous matters, into the recording head 12. The size of the pores of the filter 54 is preferably about 5 μm to 20 μm. Using the filter 54 having such a fine pores reliably prevents intrusion of extraneous matters, such as dust, into the ink storage chamber 35 from the outside of the case 34 by way of the output port 51a.

However, the fine-meshed filter 54 exhibits high flow passage resistance during passage of ink, which in turn induces a loss in suction pressure. For this reason, the ink cartridge 21 and the inkjet recorder 10, both of which pertain to the present invention, are provided with a mechanism for lessening the pressure loss induced by the filter 54 when the ink cartridge 21 is attached to the inkjet recorder 10.

A press pin 56 whose one end is fastened to the case 34 and whose other end extends downwardly to thus become an open end is provided on the lower surface of the case 34. As will be described later, the press pin 56 is a press member constituting an ink pressurization mechanism which pressurizes the ink in the ink supply passage, thereby generating a counter current which flows toward the case 34 opposite the supply direction toward the recording head 12, to thus feed ink from the ink supply passage to the filter 54. By means of feeding ink from the ink supply passage to the filter 54 in the manner mentioned above, the ink in the ink supply passage is joined to the ink in the case 34, whereby the pressure loss induced by the filter 54 is lessened.

EXAMPLES

More-detailed explanations are provided by means of examples of the present invention. In the following descriptions, unless other wise specified, symbol "%" represents a mass standard.

Example 1

[Ink-Wetted Member]

An ink tank [having the same shape as that of BCI-3e (model number: manufactured by Canon Inc.)] was produced by using various members as ink-wetted members.

Tank A: a polypropylene tank was molded.

Tank B: 0.05% of a hydrotalcite compound (DHT-4A manufactured by Kyowa Chemical Industrial Co., Ltd.), which is represented by $Mg_{1-x}Al_x(OH)_2 (CO_3)_{x/2}.mH_2O$ ($0<x\leqq0.5$), was mixed as a neutralizer to polypropylene, and the mixture was kneaded, to thus manufacture pellets. A tank was molded from the pellets.

Tank C: 0.01% of calcium stearate was mixed with polypropylene, and the mixture was kneaded, to thus manufacture pellets. A tank was molded from the pellets.

Tank D: 0.2% tris(4-t-butyl-2,6-dimethyl-3-hydroxybenzyl) isocyanurate was mixed with polypropylene, and the mixture was kneaded, to thus manufacture pellets. A tank was molded from the pellets.

Tank E: 0.2% of bis (m,p-dimethylbenzylidene) sorbitol was mixed with polypropylene, and the mixture was kneaded to thus manufacture pellets. A tank was molded from the pellets.

Tank F: A tank was molded from polyethylene.

Tank G: 0.05% of hydrotalcite compound (DHT-4A manufactured by Kyowa Chemical Industrial Co., Ltd.), which is represented by $Mg_{1-x}Al_x(OH)_2 (CO_3)_{x/2}.mH_2O$ ($0<x\leqq0.5$), was mixed as a neutralizer to polyethylene, and the mixture was kneaded, to thus manufacture pellets. A tank was molded from the pellets.

Tank H: 0.01% of calcium stearate was mixed with polyethylene, and the mixture was kneaded, to thus manufacture pellets. A tank was molded from the pellets.

Tank I: 0.2% tris(4-t-butyl-2,6-dimethyl-3-hydroxybenzyl) isocyanurate was mixed with polyethylene, and the mixture was kneaded, to thus manufacture pellets. A tank was molded from the pellets.

Tank J: 0.2% of bis (m,p-dimethylbenzylidene) sorbitol was mixed with polyethylene, and the mixture was kneaded to thus manufacture pellets. A tank was molded from the pellets.

Tanks K to M were formed, as comparative examples of additives to be added to polypropylene, from lithium aluminum composite hydroxy compound $[LiAl_2(OH)_6]_2 CO_3.1.6H_2O$ described in JP-A-10-139941, and tris-nonylphenylphosphate serving as an organophosphorus antioxidant and thiodipropionicdilauroylester serving as a tio-ether-based antioxidant, which are described in JP-A-10-87907.

Tank K: 0.05% of lithium aluminum composite hydroxy compound $[LiAl_2(OH)_6]_2CO_3.1.6H_2O$ was mixed with polypropylene, and the mixture was kneaded to thus manufacture pellets. A tank was molded from the pellets.

Tank L: 0.2% of tris-nonylphenylphosphate serving as an organophosphorus antioxidant was mixed with polypropylene, and the mixture was kneaded to thus manufacture pellets. A tank was molded from the pellets.

Tank M: 0.2% of thiodipropionicdilauroylester serving as a thioether-based antioxidant was mixed with polypropylene, and the mixture was kneaded to thus manufacture pellets. A tank was molded from the pellets.

(Preparation of Ink Compositions A to H)

Compositions provided below were mixed such that a total amount of the compositions assumes a value of 500 parts by mass. Further, two parts by mass of 2,2'-azobis (2,4-dimethylvaleronitrile) were further added as a polymerization initiator to the mixture. The mixture was then subjected to sufficient substitution of a nitrogen gas, whereby resin blending was obtained.

| | |
|---|---|
| Stearyl methacrylate | 20 parts by mass |
| Styrene macromer | 5 parts by mass |
| Styrene | 10 parts by mass |
| Polypropylene glycol (9) methacrylate | 10 parts by mass |
| Methacrylic acid | 10 parts by mass |
| 2-mercaptoethanol | 0.1 parts by mass |

The designations have the following meanings:

Styrene macromer: manufactured by Toagosei Co., Ltd. Trade Name: AS-6 (styrene-homopolymerized macromer, a number-average molecular weight of 6000, Polymeric functional group: a methacryloyloxymethyl group)

Polypropylene glycol (9) methacrylate: manufactured by NOF Corporation, Trade Name: Blenmer-PP-500 (the number of added moles of propylene oxide: 9)

500 parts by mass of methyl ethyl ketone were heated to 75° C. while being stirred at a nitrogen atmosphere. The resin blending was dropped for four hours in a stirred state at 75° C. Further, the blending was subjected to reaction for six hours in a stirred state at 75° C. Subsequently, a reactive component was self-cooled to 25° C., and methyl ethyl ketone was added so as to dilute the component such that a solid assumes a value of 50%, whereby a dispersed resin solution having a mean molecular weight of 19000 was obtained.

Two parts by mass of 5 mol/L sodium hydroxide solution were added to 15 parts by mass of 50% of the obtained copolymer solution, to thus neutralize the copolymer solution. Further, 7.5 parts by mass of Pigment Red 122 [Ciba specialty chemicals, Trade Name: CROMOPHTAL Jet Magenta DMQ] were added to the solution, and the mixture was kneaded for two to six hours, as required, by means of a roll mill. The kneaded product was dispersed in 100 parts by mass of ion-exchanged water. An organic solvent was completely removed from the thus-obtained dispersed product at 60° C. under reduced pressure. Further, water was removed from the product, whereby the product was condensed. Thus, water dispersion of pigment-contained vinylpolymer particles whose solid density is 20 mass percent was obtained.

| | |
|---|---|
| Water dispersion of pigment-contained vinylpolymer particles | 40 parts by mass |
| Glycerin | 8 parts by mass |
| Diethylene glycol | 8 parts by mass |
| Triethanol amine | 1 part by mass |
| Olefin E 1010 (Nissin Chemical Industry Co., Ltd.) | 1 part by mass |
| Triethyleneglycolmonobutylether | 8 parts by mass |
| Ion-exchanged water | 36 parts by mass |

These substances were blended into an ink fluid.

The ink fluid was subjected to at least one of centrifugal separation (30 minutes to one hour at 10000 to 20000 rpm, as required), ultrafiltration, and filtering, to thus separate the ink fluid. Ink compositions A to H were prepared such that a volumetric mean particle size of a desired pigment shown in table 1 and a volume percent of particles of 200 nm or more of the desired pigment were achieved.

TABLE 1

| INK COMPOSITION | VOLUME PERCENT OF PARTICLES OF 200 nm OR MORE | VOLUMETRIC MEAN PARTICLE SIZE (nm) | REMARKS |
|---|---|---|---|
| INK A | 5.0 | 110 | COMPARATIVE EXAMPLE |
| INK B | 2.2 | 110 | COMPARATIVE EXAMPLE |
| INK C | 2.0 | 110 | PRESENT INVENTION |
| INK D | 0.1 | 110 | PRESENT INVENTION |
| INK E | 2.2 | 70 | COMPARATIVE EXAMPLE |
| INK F | 2.0 | 70 | PRESENT INVENTION |
| INK G | 2.2 | 40 | COMPARATIVE EXAMPLE |
| INK H | 2.0 | 40 | PRESENT INVENTION |

(Evaluation of Ejection Precision)

The pigment ink compositions shown in Table 1 were infused into an ink tank [having the same shape as that of BCI-3e (model number: manufactured by Canon Inc.)] formed from the wetted member shown in Table 1. The ink was left for two weeks in an atmosphere of 70° C. A commercially-available inkjet recording printer PIXUS 6500i (Trade Name: Canon Inc.) was used as an inkjet recorder. A 50% Duty solid image was continuously printed on A4 PM photographic glossy paper (manufactured by Seiko Epson Corporation) by use of the ink tanks fulfilling the above requirements, until the amount of consumed ink assumed a value of 10 mL. Continuously, 1,000 droplets were dot-impacted from a single nozzle in the form of a line. A difference between a target point of impact on a paper face and the centroid of impacted ink was measured. Standard deviation was determined from data pertaining to 1000 impacts. Further, the areas where ink were impacted were measured, to thus determined standard deviation from data pertaining to 1000 impacts. The value of standard deviation pertaining to Test 101 was standardized to 100 and is provided in Table 2. Smaller values represent preferably small variations.

TABLE 2

| TEST NO. | PIGMENT INK | VOLUME % OF PARTICLES OF 200 nm OR MORE | VOLUMETRIC MEAN PARTICLE SIZE | INK-WETTED MEMBER | VARIATIONS IN POINT OF IMPACT | VARIATIONS IN IMPACTED AREA | REMARKS |
|---|---|---|---|---|---|---|---|
| TEST 101 | INK B | 2.2 | 110 | TANK F: POLYETHYLENE | 100 | 100 | COMPARATIVE EXAMPLE |
| TEST 102 | INK B | 2.2 | 110 | TANK G: POLYETHYLENE (WITH HYDROTALCITE) | 101 | 98 | COMPARATIVE EXAMPLE |
| TEST 103 | INK B | 2.2 | 110 | TANK H: POLYETHYLENE (WITH CALCIUM STEARATE) | 99 | 102 | COMPARATIVE EXAMPLE |
| TEST 104 | INK B | 2.2 | 110 | TANK I: POLYETHYLENE (WITH PHENOLIC ANTIOXIDANT) | 98 | 101 | COMPARATIVE EXAMPLE |
| TEST 105 | INK B | 2.2 | 110 | TANK J: POLYETHYLENE (WITH SORBITOL) | 99 | 103 | COMPARATIVE EXAMPLE |
| TEST 106 | INK B | 2.2 | 110 | TANK A: POLYPROPYLENE | 102 | 99 | COMPARATIVE EXAMPLE |
| TEST 107 | INK B | 2.2 | 110 | TANK B: POLYPROPYLENE (WITH HYDROTALCITE) | 101 | 98 | COMPARATIVE EXAMPLE |
| TEST 108 | INK B | 2.2 | 110 | TANK C: POLYPROPYLENE (WITH CALCIUM STEARATE) | 98 | 102 | COMPARATIVE EXAMPLE |
| TEST 109 | INK B | 2.2 | 110 | TANK D: POLYPROPYLENE (WITH PHENOLIC ANTIOXIDANT) | 103 | 98 | COMPARATIVE EXAMPLE |
| TEST 110 | INK B | 2.2 | 110 | TANK E: POLYPROPYLENE (WITH SORBITOL) | 100 | 102 | COMPARATIVE EXAMPLE |
| TEST 111 | INK C | 2.0 | 110 | TANK F: POLYETHYLENE | 98 | 101 | COMPARATIVE EXAMPLE |
| TEST 112 | INK C | 2.0 | 110 | TANK G: POLYETHYLENE (WITH HYDROTALCITE) | 92 | 93 | PRESENT INVENTION |
| TEST 113 | INK C | 2.0 | 110 | TANK H: POLYETHYLENE (WITH CALCIUM STEARATE) | 93 | 92 | PRESENT INVENTION |
| TEST 114 | INK C | 2.0 | 110 | TANK I: POLYETHYLENE (WITH | 90 | 94 | PRESENT INVENTION |

TABLE 2-continued

| TEST NO. | PIGMENT INK | VOLUME % OF PARTICLES OF 200 nm OR MORE | VOLUMETRIC MEAN PARTICLE SIZE | INK-WETTED MEMBER | VARIATIONS IN POINT OF IMPACT | VARIATIONS IN IMPACTED AREA | REMARKS |
|---|---|---|---|---|---|---|---|
| TEST 115 | INK C | 2.0 | 110 | TANK J: POLYETHYLENE (WITH SORBITOL) PHENOLIC ANTIOXIDANT) | 92 | 93 | PRESENT INVENTION |
| TEST 116 | INK C | 2.0 | 110 | TANK A: POLYPROPYLENE | 101 | 98 | COMPARATIVE EXAMPLE |
| TEST 117 | INK C | 2.0 | 110 | TANK B: POLYPROPYLENE (WITH HYDROTALCITE) | 85 | 84 | PRESENT INVENTION |
| TEST 118 | INK C | 2.0 | 110 | TANK C: POLYPROPYLENE (WITH CALCIUM STEARATE) | 86 | 86 | PRESENT INVENTION |
| TEST 119 | INK C | 2.0 | 110 | TANK D: POLYPROPYLENE (WITH PHENOLIC ANTIOXIDANT) | 84 | 86 | PRESENT INVENTION |
| TEST 120 | INK C | 2.0 | 110 | TANK E: POLYPROPYLENE (WITH SORBITOL) | 86 | 84 | PRESENT INVENTION |
| TEST 121 | INK C | 2.0 | 110 | TANK K: POLYPROPYLENE (WITH LITHITUM ALUMINUM COMPOSITE HYDROXY COMPOUND) | 101 | 100 | COMPARATIVE EXAMPLE |
| TEST 122 | INK C | 2.0 | 110 | TANK L: POLYPROPYLENE (WITH ORGANOPHOSPHOROUS ANTIOXIDANT) | 99 | 101 | COMPARATIVE EXAMPLE |
| TEST 123 | INK C | 2.0 | 110 | TANK M: POLYPROPYLENE (WITH THIOETHER-BASED ANTIOXIDANT) | 98 | 102 | COMPARATIVE EXAMPLE |

As can be seen from Tests 101 to 110, the evaluation of precision of ink ejection achieved by use of pigment ink B (the volume percent of particles of 200 nm or more in a pigment is 2.2 %) after the ink had been stored at high temperature shows that influence imposed on the precision of ejection of polyethylenes and polypropylenes, which were employed as the ink-wetted members, can be said to be small. As can be seen from Tests 111 and 116, even when ink C whose volume percent of particles of 200 nm or more in a pigment is 2.0% or less was used as pigment ink, influence imposed on the precision of ejection is understood to be small in a case where the ink-wetted members are polyethylene and polypropylene. However, Tests 112 to 115 and Tests 117 to 120 show that, when ink C whose volume percent of particles of 200 nm or more in a pigment is 2.0% or less was used as pigment ink and when polyethylenes and polypropylenes of the present invention were used as ink-wetted members, the precision of ejection is understood to have been improved significantly. As can be seen from Tests 121 to 123, a combination of the polypropylenes with additives, which do not belong the present invention, with the ink whose volume percent of particles of 200 nm or more in a pigment is 2% or less, which belongs to the present invention, is not effective.

TABLE 3

| TEST NO. | PIGMENT INK | VOLUME % OF PARTICLES OF 200 nm OR MORE | VOLUMETRIC MEAN PARTICLE SIZE (nm) | INK-WETTED MEMBER | VARIATIONS IN POINT OF IMPACT | VARIATIONS IN IMPACTED AREA | REMARKS |
|---|---|---|---|---|---|---|---|
| TEST 201 | INK B | 2.2 | 110 | TANK F: POLYETHYLENE | 100 | 100 | COMPARATIVE EXAMPLE |
| TEST 202 | INK B | 2.2 | 110 | TANK A: POLYPROPYLENE | 102 | 99 | COMPARATIVE EXAMPLE |
| TEST 203 | INK B | 2.2 | 110 | TANK B: POLYPROPYLENE (WITH HYDROTALCITE)) | 101 | 98 | COMPARATIVE EXAMPLE |
| TEST 204 | INK C | 2.0 | 110 | TANK F: POLYETHYLENE | 98 | 101 | COMPARATIVE EXAMPLE |
| TEST 205 | INK C | 2.0 | 110 | TANK A: POLYPROPYLENE | 101 | 98 | COMPARATIVE EXAMPLE |

TABLE 3-continued

| TEST NO. | PIGMENT INK | VOLUME % OF PARTICLES OF 200 nm OR MORE | VOLUMETRIC MEAN PARTICLE SIZE (nm) | INK-WETTED MEMBER | VARIATIONS IN POINT OF IMPACT | VARIATIONS IN IMPACTED AREA | REMARKS |
|---|---|---|---|---|---|---|---|
| TEST 206 | INK C | 2.0 | 110 | TANK B: POLYPROPYLENE (WITH HYDROTALCITE) | 85 | 84 | PRESENT INVENTION |
| TEST 207 | INK A | 5.0 | 110 | TANK F: POLYETHYLENE | 130 | 115 | COMPARATIVE EXAMPLE |
| TEST 208 | INK A | 5.0 | 110 | TANK A: POLYPROPYLENE | 133 | 112 | COMPARATIVE EXAMPLE |
| TEST 209 | INK A | 5.0 | 110 | TANK B: POLYPROPYLENE (WITH HYDROTALCITE) | 129 | 113 | COMPARATIVE EXAMPLE |
| TEST 210 | INK D | 0.1 | 110 | TANK F: POLYETHYLENE | 98 | 101 | COMPARATIVE EXAMPLE |
| TEST 211 | INK D | 0.1 | 110 | TANK A: POLYPROPYLENE | 97 | 100 | COMPARATIVE EXAMPLE |
| TEST 212 | INK D | 0.1 | 110 | TANK B: POLYPROPYLENE (WITH HYDROTALCITE) | 83 | 82 | PRESENT INVETION |
| TEST 213 | INK E | 2.2 | 70 | TANK F: POLYETHYLENE | 97 | 99 | COMPARATIVE EXAMPLE |
| TEST 214 | INK E | 2.2 | 70 | TANK A: POLYPROPYLENE | 96 | 101 | COMPARATIVE EXAMPLE |
| TEST 215 | INK E | 2.2 | 70 | TANK B: POLYPROPYLENE (WITH HYDROTALCITE) | 97 | 102 | COMPARATIVE EXAMPLE |
| TEST 216 | INK F | 2.0 | 70 | TANK F: POLYETHYLENE | 99 | 101 | COMPARATIVE EXAMPLE |
| TEST 217 | INK F | 2.0 | 70 | TANK A: POLYPROPYLENE | 97 | 98 | COMPARATIVE EXAMPLE |
| TEST 218 | INK F | 2.0 | 70 | TANK B: POLYPROPYLENE (WITH HYDROTALCITE) | 84 | 83 | PRESENT INVENTION |
| TEST 219 | INK G | 2.2 | 40 | TANK F: POLYETHYLENE | 101 | 99 | COMPARATIVE EXAMPLE |
| TEST 220 | INK G | 2.2 | 40 | TANK A: POLYPROPYLENE | 100 | 102 | COMPARATIVE EXAMPLE |
| TEST 221 | INK G | 2.2 | 40 | TANK B: POLYPROPYLENE (WITH HYDROTALCITE) | 98 | 98 | COMPARATIVE EXAMPLE |
| TEST 222 | INK H | 2.0 | 40 | TANK F: POLYETHYLENE | 99 | 100 | COMPARATIVE EXAMPLE |
| TEST 223 | INK H | 2.0 | 40 | TANK A: POLYPROPYLENE | 98 | 97 | COMPARATIVE EXAMPLE |
| TEST 224 | INK H | 2.0 | 40 | TANK B: POLYPROPYLENE (WITH HYDROTALCITE) | 86 | 83 | PRESENT INVENTION |

As can be seen from Tests 201 to 203, 207 to 209, 213 to 215, and 219 to 221, when pigment ink B, ink A, ink E, and ink G, whose volume percent of particles of 200 nm or more in a pigment is 2% or more, were used, evaluation of precision of ink ejection achieved after ink had been stored at high temperatures shows that influence imposed on the precision of ejection of polyethylenes and polypropylenes, which were employed as the ink-wetted members, can be said to be small. As can be seen from Tests 204, 205, 210, 211, 216, 217, 222, and 223, even when ink whose volume percent of particles of 200 nm or more in a pigment is 2.0% or less was used as pigment ink, influence imposed on the precision of ejection is understood to be small in a case where the ink-wetted member is polyethylene and polypropylene. However, as can be seen from Tests 206, 212, 218, and 224, when polypropylenes of the present invention were used as the ink-wetted members by using ink whose volume percent of particles of 200 nm or more in a pigment is 2.0% or less as pigment ink, the precision of ejection is understood to have been improved significantly. From the above, the volumetric mean particle size of a pigment does not affect the precision of ejection of ink, but volume percent of particles of 200 nm or more in a pigment is 2.0% or less is understood to be important.

Example 2

Ink to which 2% of a water-soluble planar compound P-1 was added was prepared as an ink composition. Addition/non-addition of the compound is provided in Table 4.

TABLE 4

| TEST NO. | PIGMENT INK | VOLUME % OF PARTICLES OF 200 nm OR MORE | VOLUMETRIC MEAN PARTICLE SIZE (nm) | INK-WETTED MEMBER | WATER-SOLUBLE PLANAR COMPOUND | VARIATIONS IN POINT OF IMPACT | VARIATIONS IN IMPACTED AREA | REMARKS |
|---|---|---|---|---|---|---|---|---|
| TEST 301 | INK B | 2.2 | 110 | TANK F: POLYETHYLENE | NONE | 100 | 100 | COMPARATIVE EXAMPLE |
| TEST 302 | INK B | 2.2 | 110 | TANK B: POLYPROPYLENE (WITH HYDROTALCITE | NONE | 101 | 98 | COMPARATIVE EXAMPLE |
| TEST 303 | INK C | 2.0 | 110 | TANK F: POLYETHYLENE | NONE | 98 | 101 | COMPARATIVE EXAMPLE |
| TEST 304 | INK C | 2.0 | 110 | TANK B: POLYPROPYLENE (WITH HYDROTALCITE | NONE | 85 | 84 | PRESENT INVENTION |
| TEST 305 | INK B | 2.2 | 110 | TANK F: POLYETHYLENE | (WITH 2% OF) COMPOUND P-1 | 101 | 103 | COMPARATIVE EXAMPLE |
| TEST 306 | INK B | 2.2 | 110 | TANK B: POLYPROPYLENE (WITH HYDROTALCITE | (WITH 2% OF) COMPOUND P-1 | 99 | 101 | COMPARATIVE EXAMPLE |
| TEST 307 | INK C | 2.0 | 110 | TANK F: POLYETHYLENE | (WITH 2% OF) COMPOUND P-1 | 99 | 98 | COMPARATIVE EXAMPLE |
| TEST 308 | INK C | 2.0 | 110 | TANK B: POLYPROPYLENE (WITH HYDROTALCITE | (WITH 2% OF) COMPOUND P-1 | 82 | 80 | PRESENT INVENTION |

As can be seen from a comparison between Tests 201 to 204 and Tests 205 to 208, when ink B whose volume percent of particles of 200 nm or more in a pigment is 2.0% or more is used as ink and when the ink-wetted member is polyethylene, addition of a water-soluble planar compound to ink is understood to exhibit small influence. In the case of ink C whose volume percent of particles of 200 nm or more in a pigment is 2.0% or less and the ink-wetted members, both of which belong to the present invention, addition of the water-soluble planar compound to ink is understood to enhance the precision of ejection.

Example 3

Evaluation was made under the conditions for Example 1 and Example 2 by means of replacing CI Pigment Red-122 employed as a pigment in Examples 1 and 2 with CI Pigment Yellow-12, CI Pigment Yellow-17, CI Pigment Yellow-55, CI Pigment Yellow-74, CI Pigment Yellow-97, CI Pigment Yellow-120, CI Pigment Yellow-128, CI Pigment Yellow-151, CI Pigment Yellow-155, and CI Pigment Yellow-180; CI Pigment Violet-19; CI Pigment Red-57:1, CI Pigment Red-146; and CI Pigment Blue-15:3. As a result, superior performance was exhibited, as in the case of Compound 1.

Example 4

Pigment ink whose volume percent of particles of 200 nm or more in a pigment is 1.0% or less and pigment ink whose volume percent of particles of 200 nm or more in a pigment is 0.5% or less were prepared. These two types of ink were evaluated under the conditions for Examples 1 to 3. The pigment ink whose volume percent of particles of 200 nm or more in a pigment is 1.0% or less was ascertained to exhibit superior performance when compared with whose volume percent of particles of 200 nm or more in a pigment is 2.0% or less. Pigment ink whose volume percent of particles of 200 nm or more in a pigment is 0.5% or less was ascertained to have exhibited much superior performance.

Example 5

Tanks were prepared from polyacetal, unsaturated polyester, PS, PET, and PVC for comparative tests of the ink-wetted members, and the tanks were evaluated under the conditions for Examples 1 and 2. A combination of the members with the pigment ink whose volume percent of particles of 200 nm or more in a pigment is 2% or less showed no improvement in ejection precision.

Example 6

In relation to the ink absorber complying with the ink tank [BCI-3e (model number: manufactured by Canon Inc.)], ink absorbers were prepared from the same ink-wetted members as those of the tanks A to M of Example 1. Tests analogous to those of Example 1 were conducted, whereby a combination of the pigment ink whose volume percent of particles of 200 nm or more in a pigment is 2% or less with the ink-wetted members of the present invention showed superior ejection accuracy.

By means of configuration of the present invention, when ink having remained in contact with the wetted member used in the inkjet recorder for a long period of time and at a comparatively-low temperature or for a short period of time and at a comparatively-high temperature, variations in the volume of ejected ink and displacement of ink from a target point of impact can be reduced.

The entire disclosure of each and every foreign patent application from which the benefit of foreign priority has been claimed in the present application is incorporated herein by reference, as if fully set forth.

What is claimed is:
1. An ink unit comprising: an ink utilized for an inkjet recorder; and
   a wetted member that contacts with the ink, wherein the ink comprises a pigment dispersedly held in a medium, and the pigment contains particles of 200 nm or larger in 2 percent by volume or less, and wherein a principal component of the ink-wetted member is a polyolefin produced by addition of a hydrotalcite compound represented by formula (X):

Formula (X)

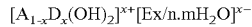

$[A_{1-x}D_x(OH)_2]^{x+}[E_{x/n}.mH_2O]^{x-}$ wherein A in Formula (X) represents a divalent metal;
D represents a trivalent metal;
E represents an n-valence anion;
"m" represents an integer; and
"x" ranges from $0 < x \leqq 0.5$.

2. The ink unit according to claim 1, wherein the pigment is one of CI Pigment Yellow-12, CI Pigment Yellow-17, CI Pigment Yellow-55, CI Pigment Yellow-74, CI Pigment Yellow-97, CI Pigment Yellow-120, CI Pigment Yellow-128, CI Pigment Yellow-151, CI Pigment Yellow-155 and CI Pigment Yellow-180.

3. The ink unit according to claim 1, wherein the pigment is one of CI Pigment Red-122, CI Pigment Violet-19, CI Pigment Red-57:1, CI Pigment Red-146 and CI Pigment Blue-15:3.

4. The ink unit according to claim 1, wherein the ink is an ink set comprising at least a black ink, a cyan ink, a magenta ink and a yellow ink, and wherein all of the black ink, the cyan ink, the magenta ink and the yellow ink contain a pigment dispersedly held in a medium, and the pigment contains particles of 200 nm or larger in 2 percent by volume or less.

5. The ink unit according to claim 1, wherein the pigment contains particles of 200 nm or larger in 1 percent by volume or less.

6. The ink unit according to claim 1, wherein the pigment contains particles of 200 nm or larger in 0.5 percent by volume or less.

7. The ink unit according to claim 1, wherein the polyolefin is a polypropylene.

8. The ink unit according to claim 1, wherein the ink-wetted member is an ink-wetted member of at least one of an ink tank and an ink cartridge.

9. The ink unit according to claim 1, wherein the ink-wetted member is an ink-wetted member of an ink absorber.

10. The ink unit according to claim 1, wherein the ink-wetted member is an ink-wetted member of at least one of a tube of an ink supply system, a common flow passage of a head, a pressure chamber of a head and a nozzle of a head.

11. The ink unit according to claim 1, wherein the hydrotalcite compound represented by the formula $Mg_{1-x}Al_x(OH)_2(CO_3)_{x/2}.mH_2O$ wherein "x" ranges from $0 < x \leqq 0.5$.

12. The ink unit according to claim 1, wherein the polyolefin is polyethylene or polypropylene.

* * * * *